(12) United States Patent
Fiske

(10) Patent No.: US 12,473,884 B2
(45) Date of Patent: Nov. 18, 2025

(54) GPP SEAL SYSTEM MAINTENANCE, REPLACEMENT AND SEISMIC ISOLATION

(71) Applicant: Gravity Power, LLC, Santa Barbara, CA (US)

(72) Inventor: Orlo James Fiske, Santa Barbara, CA (US)

(73) Assignee: THE GRAVITY POWER, LLC, Santa Barbara, CA (US)

( * ) Notice: Subject to any disclaimer, the term of this patent is extended or adjusted under 35 U.S.C. 154(b) by 66 days.

(21) Appl. No.: 18/557,362

(22) PCT Filed: May 4, 2022

(86) PCT No.: PCT/US2022/027578
§ 371 (c)(1),
(2) Date: Oct. 26, 2023

(87) PCT Pub. No.: WO2022/235730
PCT Pub. Date: Nov. 10, 2022

(65) Prior Publication Data
US 2024/0200524 A1 Jun. 20, 2024

Related U.S. Application Data

(60) Provisional application No. 63/184,066, filed on May 4, 2021.

(51) Int. Cl.
*F03B 11/00* (2006.01)
*F03B 13/06* (2006.01)
*F03G 3/00* (2006.01)

(52) U.S. Cl.
CPC ............ *F03B 11/006* (2013.01); *F03B 13/06* (2013.01); *F03G 3/094* (2021.08); *F05B 2240/57* (2013.01); *F05B 2260/422* (2020.08)

(58) Field of Classification Search
CPC ........ F03B 11/006; F03B 13/06; F03G 3/094; F05B 2240/57; F05B 2260/422; Y02E 10/20
See application file for complete search history.

(56) References Cited

U.S. PATENT DOCUMENTS

| | | | | |
|---|---|---|---|---|
| 4,845,376 A | * | 7/1989 | Bendiks | F03B 13/00 290/1 R |
| 6,546,726 B1 | * | 4/2003 | Tomoiu | F03B 17/02 60/495 |

(Continued)

*Primary Examiner* — Dustin T Nguyen
(74) *Attorney, Agent, or Firm* — Aziz M. Ahsan; Ahsan & Associates, PLLC

(57) ABSTRACT

A sealing system for a Gravity Power Plant having a shaft (104) with a shaft wall (105) and a piston (102) incorporates a seal assembly support base (202) anchored into the shaft wall and surrounding the piston. A seal mount has a radial flange (210) to anchor the seal mount to the support base (202) and a vertical flange (212) extending from an inner circumference of the radial flange. A seal assembly (206) circumferentially contacting the piston, has a plurality of circumferentially spaced clamp assemblies (227) to engage the seal assembly to the vertical flange, the clamp assemblies having an open position releasing the seal assembly from the vertical flange and a closed position constraining the seal assembly on the vertical flange. For seismic isolation of the seal assembly the radial flange is supported on a lower bearing (406) supported on a top surface of the seal assembly support base proximate an inner surface. The radial flange (410) extends inward from the inner surface with the vertical flange spaced from the inner surface by a radial relief (428) within a gap between the seal assembly support base and the piston. An upper bearing is supported in engagement with a top surface (411) of the radial flange (410) of the seal mount (404).

17 Claims, 22 Drawing Sheets

(56) References Cited

U.S. PATENT DOCUMENTS

| | | | |
|---|---|---|---|
| 9,869,291 B2* | 1/2018 | Fiske | F03B 11/006 |
| 10,233,897 B2* | 3/2019 | Stenzel | F03B 17/025 |
| 2013/0174725 A1* | 7/2013 | Heindl | F15B 1/045 |
| | | | 405/133 |
| 2014/0042753 A1* | 2/2014 | Bahner | F03D 9/255 |
| | | | 290/1 R |

* cited by examiner

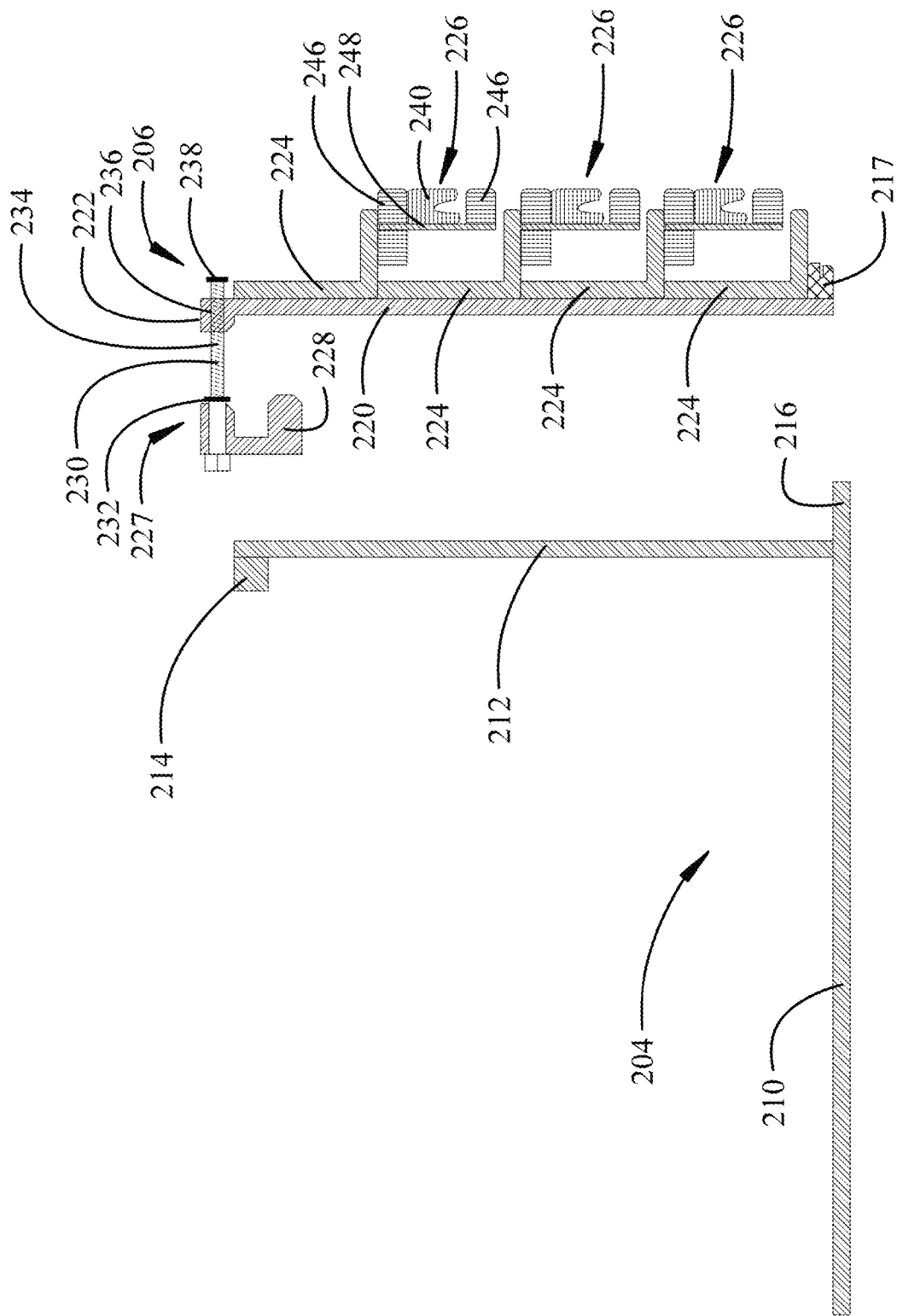

GPP SEAL SYSTEM MAINTENANCE, REPLACEMENT AND SEISMIC ISOLATION

REFERENCE TO RELATED APPLICATIONS

This application claims the priority of U.S. provisional application Ser. No. 63/184,066, filed on May 4, 2021 entitled GPP Seal System Maintenance, Replacement and Seismic Isolation having a common assignee with the present application, the disclosure of which is incorporated herein by reference.

FIELD OF THE INVENTION

The implementations disclosed herein relate generally to fluid sealing systems in a gravity-hydraulic energy storage system referred to herein as a "Gravity Power Plant" or "GPP". More particularly, the implementations provide a removable seal assembly and associated seal mount and support base with a servicing hoist and carriage system as well as a seismic isolation configuration for the seal mount and support base.

BACKGROUND OF THE INVENTION

Providing adequate energy to power all the various needs of society is becoming more problematic every year. Conventional sources such as coal, petroleum and gas, are becoming more expensive and harder to find. At the same time, the byproducts of combustion produce air pollution and elevate atmospheric carbon dioxide, threatening severe consequences for global environment. Renewable sources of energy, particularly solar collectors and wind turbines, could largely replace hydrocarbons if they could be converted from intermittent production to reliable, dispatchable power supplies. This could be accomplished by directing a significant fraction of the output from solar and/or wind sources into large-scale energy storage units, which would then release that energy as needed.

The primary technology currently in use for very high capacity energy storage is pumped hydro. A typical installation employs two large water reservoirs at different elevations, with water pumped from the low reservoir to the high reservoir whenever excess energy is available. Upon demand, water is released from the high reservoir through hydraulic turbines into the low reservoir to generate electricity. Large installations can have a peak output power of more than 1000 megawatts and a storage capacity of thousands of megawatt-hours. Pumped hydro has been the premier bulk storage technology for decades, with over 150 GW of capacity worldwide, but geographic, geologic and environmental constraints associated with reservoir design in addition to increased construction costs have made it much less attractive for future expansion. Thus this technology is not a practical method to provide the wide applicability, terawatt capacity, low cost and environmental compatibility required to support a major conversion of the energy infrastructure from hydrocarbon to renewable sources of energy.

U.S. Pat. No. 8,166,760 titled "System and Method for Storing Energy", issued May 1, 2012 to the present inventor and incorporated by reference here in its entirety, describes a system and method for storing energy that avoids the constraints of pumped hydro while providing similar or better energy storage performance and economics. U.S. Pat. No. 9,869,291, issued Jan. 16, 2018 having a common assignee with the present application and incorporated by reference here in its entirety, describes improvements to the System and Method for Storing Energy. In this system a large piston is suspended in a deep vertical shaft filled with water (FIG. 1A (prior art)). A pump-turbine is connected by pipelines to the top and bottom of the shaft, with the pump-turbine connected through a driveshaft to an electric motor/generator. Off-peak or renewable energy, such as wind energy, is used to power the electric motor to spin the pump, creating high pressure underneath the piston that lifts it toward the top of the shaft, storing energy in the form of gravitational potential energy. As needed thereafter, the piston lowers in the shaft forcing water back through the connection pipe and turbine, spinning the generator to produce electric power to supply the electric power grid.

In order for this energy storage system to operate effectively, store hundreds of megawatt-hours of electricity or more, and accommodate input and output power levels of tens or hundreds of megawatts or more, the piston must be very large and the water pressure must be quite high. High pressure water must be prevented from escaping between the piston and the shaft wall, which would impair system operation and reduce efficiency. In much smaller systems, such as conventional hydraulic cylinders, seals are used to block such fluid flow. These seals typically slide along the surface of the piston or shaft wall. Static seals with constant diameter are used with polished pistons and/or shafts that have an accurate, constant diameter. Dynamic or flexing seals can be used to accommodate variations of a few millimeters in piston or shaft diameter, at most.

In the present energy storage system, however, the piston can have a diameter of tens of meters or more and a height of hundreds of meters. It is not economically feasible to construct such a piston or shaft with a highly accurate diameter that does not vary over the vertical extent of the piston or shaft. In fact, even with careful implementation practical construction techniques can easily result in piston or shaft diameter or verticality variation of several centimeters.

SUMMARY OF THE INVENTION

The present implementations disclose a sealing system for a Gravity Power Plant having a shaft 104 with a shaft wall 105 and a piston 102. The sealing system incorporates a seal assembly support base 202 anchored into the shaft wall and surrounding the piston. A seal mount 204 has a radial flange 210 adapted to anchor the seal mount to the support base 202 and a vertical flange 212 extending from an inner circumference of the radial flange. A seal assembly 206 having at least one seal group 226 circumferentially contacting the piston, has a plurality of circumferentially spaced clamp assemblies 227 configured to engage the seal assembly to the vertical flange, the clamp assemblies having an open position releasing the seal assembly from the vertical flange and a closed position constraining the seal assembly on the vertical flange.

Additional implementations provide seismic isolation of the seal assembly wherein the seal assembly support base has an inner surface 424 with an inner radius 420, providing a gap 422 between an inner surface 424 of the support base 402 and a surface 103 of the piston 102. The radial flange is supported on a lower bearing 406 supported on a top surface of the seal assembly support base proximate the inner surface. The seal mount circumferentially surrounds the piston 102 and the radial flange 410 extends inward from the inner surface of the seal assembly support base with the vertical flange spaced from the inner surface by a radial relief 428 within the gap. An upper bearing is supported in engagement with a top surface 411 of the radial flange 410 of the seal mount 404.

BRIEF DESCRIPTION OF THE DRAWINGS

FIG. 4 is a close-up cross section view of the seal mount.

FIG. 5 shows the seal assembly and locking clamp.

DETAILED DESCRIPTION

The following detailed description is of the best presently contemplated mode for the implementations disclosed herein. This description is not to be taken in a limiting sense but is made merely for the purpose of illustrating the general principles of the invention.

Figure 1A:
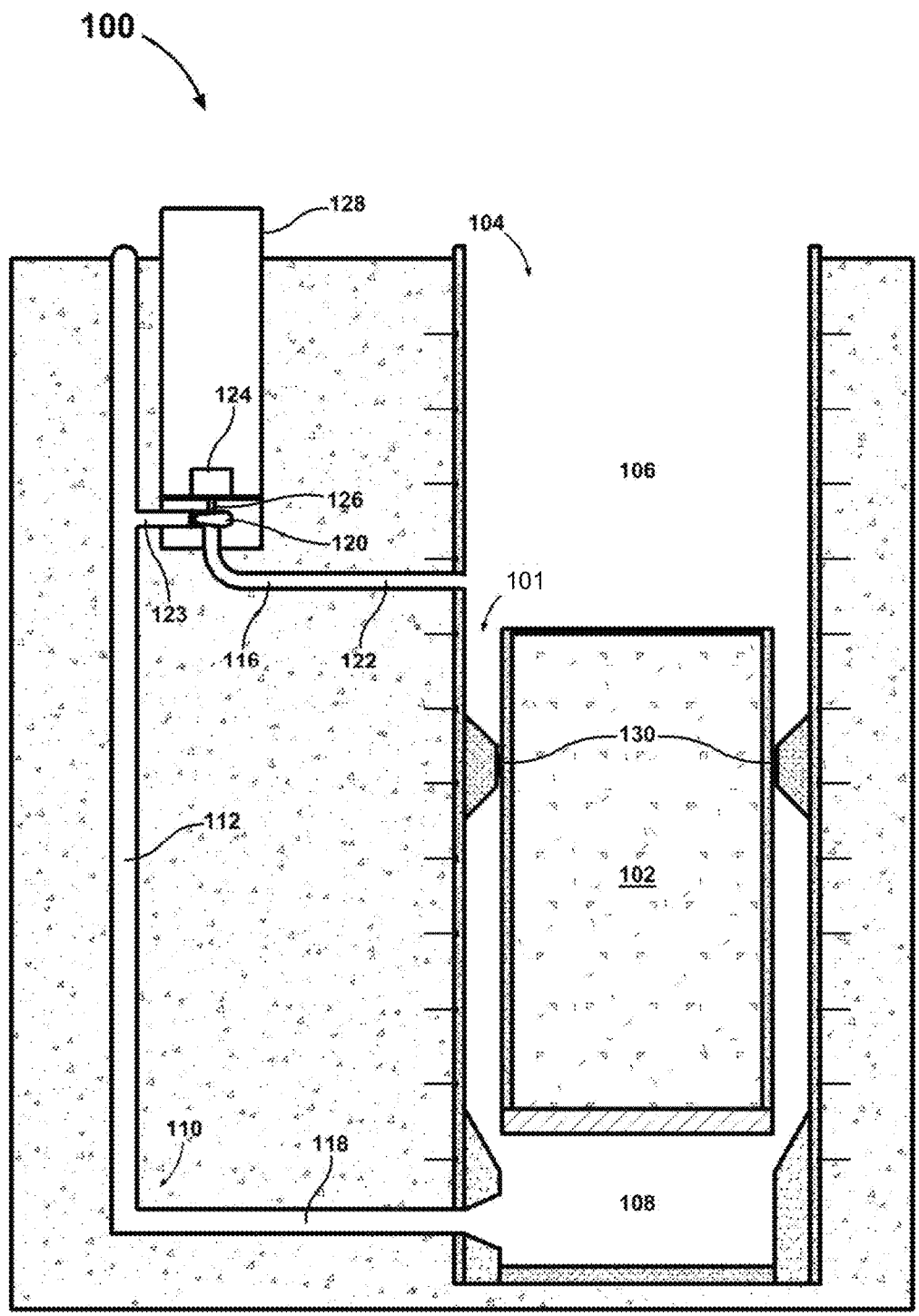
FIG. 1A (prior art) is a schematic of the basic Gravity Power Plant (GPP) design.
Figure 1B:
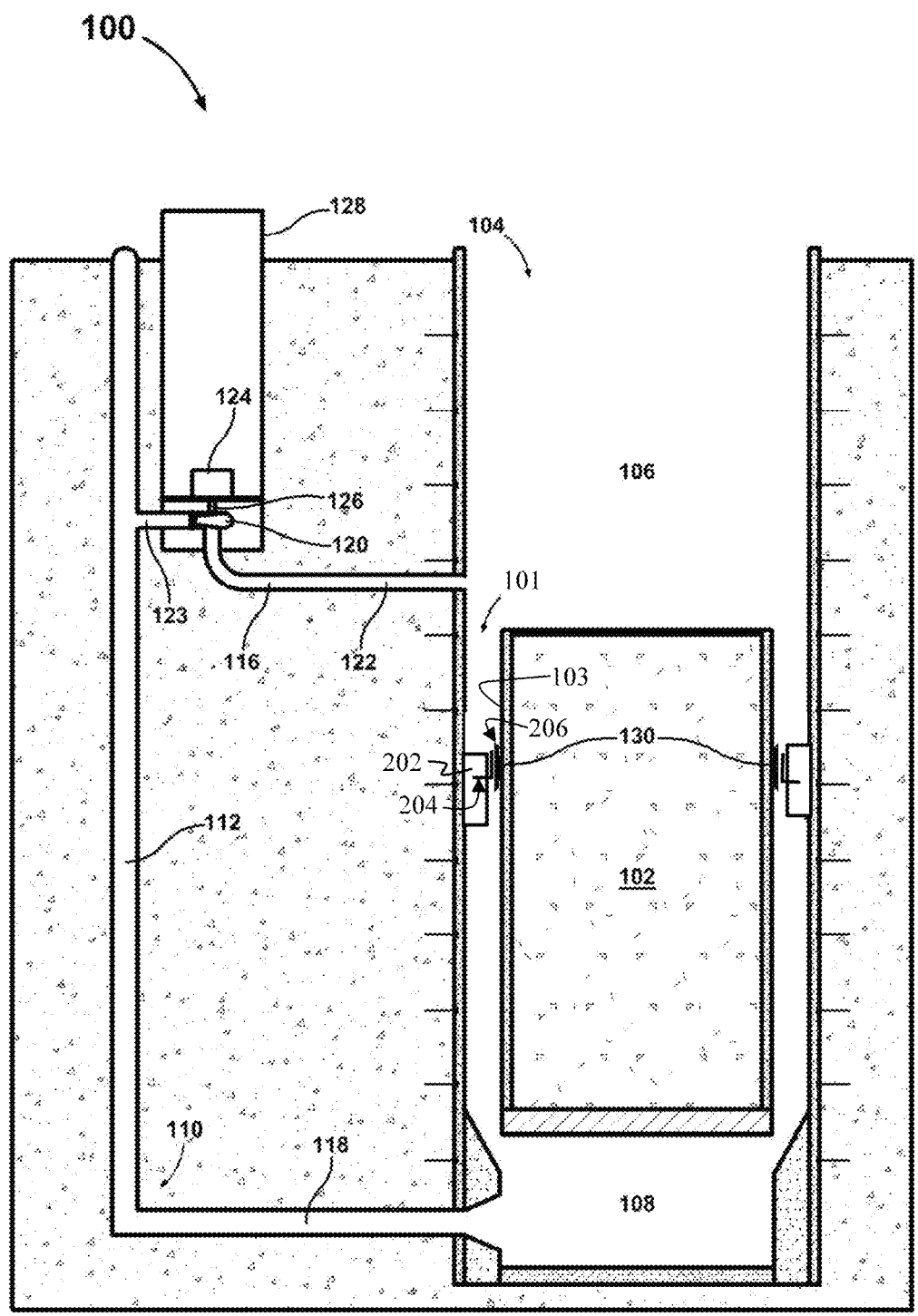
FIG. 1B is a schematic representation of the present implementation.

FIG. 1A (prior art) is a schematic representation of a Gravity Power Plant as disclosed in U.S. Pat. No. 9,869,291. FIG. 1B is a schematic representation of the implementation of the GPP disclosed herein with common elements having consistent numbering. As seen in FIGS. 1A and 1B, a large scale energy storage system 100 for storing energy is shown. The energy storage system 100 operates similarly to the energy storage system 60 described above and includes a body, shown as a large piston 102 that is suspended in a deep vertical shaft 104 having an internal volume filled with a working fluid, such as water. The piston 102 is configured to have a relatively constant circumference along its height and a smooth, hard outer surface. The piston 102 divides the internal volume of the shaft 104 into a first or upper chamber 106 above the piston 102 and a second or lower chamber 108 below the piston 102. The chambers 106 and 108 are in fluid communication with each other through a passage 110. The passage 110 includes a vertical passage 112 (e.g., penstock). The vertical passage 112 is in communication with the upper chamber 106 through an upper cross passage 116 (e.g., tailrace) and in communication with the lower chamber 108 through a lower cross-passage 118. As the piston 102 moves in the shaft 104, the volumes of the chambers 106 and 108 increase and decrease, forcing the fluid between the chambers 106 and 108 through the passage 110.

A pump-turbine 120 is disposed in the upper cross passage 116, such that fluid flowing through the passage 110 turns the pump-turbine 120. The pump-turbine 120 separates the upper cross passage 116 into first portion 122 extending from the pump-turbine 120 to the upper chamber 106 and a second portion 123 extending from the pump-turbine 120 to the vertical passage 112. The pump-turbine 120 is a rotational device that is configured to operate as a pump when rotating in a first direction and as a turbine when rotating in a second, opposite direction. The pump-turbine 120 is mechanically coupled to an electric motor/generator 124, such as via a driveshaft 126. The pump-turbine 120 may be coupled to the driveshaft 126 via an intermediate member, such as a clutch or a torque converter to allow the pump-turbine 120 to be mechanically decoupled from the electric motor/generator 124. One or more of the pump-turbine 120, the electric motor/generator 124, and the driveshaft 126 may be housed in a facility such as a powerhouse 128 that extends underground from the surface.

The motor/generator 124 is connected to an external source and destination for electric power, such as the electric power grid. Energy to be stored in the energy storage system 100 is used to drive the electric motor/generator 124, rotating the pump-turbine 120 through the interconnection of the motor/generator 124, the driveshaft 126, and the pump-turbine 120. The pump-turbine 120 forces fluid through the passage 110 from the upper chamber 106 to the lower chamber 108, creating a higher pressure in the lower chamber 108 underneath the piston 102. The pressure differential lifts the piston 102 upwards, toward the top of the shaft 104, storing energy in the form of gravitational potential energy. The stored energy may be output from the energy storage system 100 by allowing the piston 102 to descend in the shaft 104. The weight of the piston forces fluid through the passage 110 from the lower chamber 108 to the upper chamber 106. The fluid flows through the pump-turbine 120, rotating the pump-turbine 120. The motor/generator 124 is driven through the interconnection of the motor/generator 124, the driveshaft 126, and the pump-turbine 120 to produce electric power. The electric power may be supplied, for example to the electric power grid.

The relatively large size and vertical movement of the piston 102 and the relatively small drag losses because of the relatively modest speed of the piston 102 allows for substantial energy to be stored in the energy storage system 100. According to one exemplary embodiment, the shaft has a diameter of approximately 30 meters and a depth of approximately 500 meters and the piston has a height of approximately 250 meters and a volume of approximately 174,000 cubic meters. The piston 102 may be formed substantially from concrete, which has a negative buoyancy in water of approximately 1500 kg per cubic meter, providing a downward force of approximately 14700 Newtons. The energy (work) released by lowering one cubic meter of concrete through 1000 meters of elevation in water is:

$$W = \text{Force} \times \text{distance} =$$
$$14{,}700\,N \times 1{,}000\,m = 14.7 \text{ megajoules} = \sim 4.1 \text{ kilowatt-hours}$$

For a concrete piston with a volume of approximately 174,000 cubic meters moving through an elevation change of 250 meters, the resulting storage capacity exceeds 160 megawatt-hours A sealing system 130 is provided surrounding the piston 102 and disposed in an annular space 101 between the piston 102 and the wall of the shaft 104. The sealing system 130 is configured to prevent the flow of fluid around the piston 102 between the upper chamber 106 and the lower chamber 108. A wall 105 of the shaft 104, an outer surface 103 of the piston 102 and the sealing system 130 are configured to prevent high pressure or particulates in the fluid from causing damage to the shaft 104, the piston 102, or the seal assembly 130 and to maximize the operational lifetime of the energy storage system 100.

In the disclosed implementation, seal elements in sealing system 130 press against the outer surface 103 of piston 102, which moves up and down past sealing system 130. In other implementations the sealing system 130 may be attached to piston 102 and press against the shaft wall 105. The seal elements in sealing system 130 will eventually wear down and require replacement, but because they may be up to 500 meters or more below the surface of the water inside shaft 104 such replacement can be difficult and could even require that all the water in upper shaft chamber 106 be pumped out to allow direct access to the sealing system.

In the implementation disclosed in FIG. 1B, the sealing system 130 incorporates a seal assembly support base 202 extending from or mounted to the shaft wall 105. A seal mount 204 is supported by the seal assembly support base 202 and a seal assembly 206 is, in turn supported by the seal mount, as will be described in detail subsequently.

Figure 2:
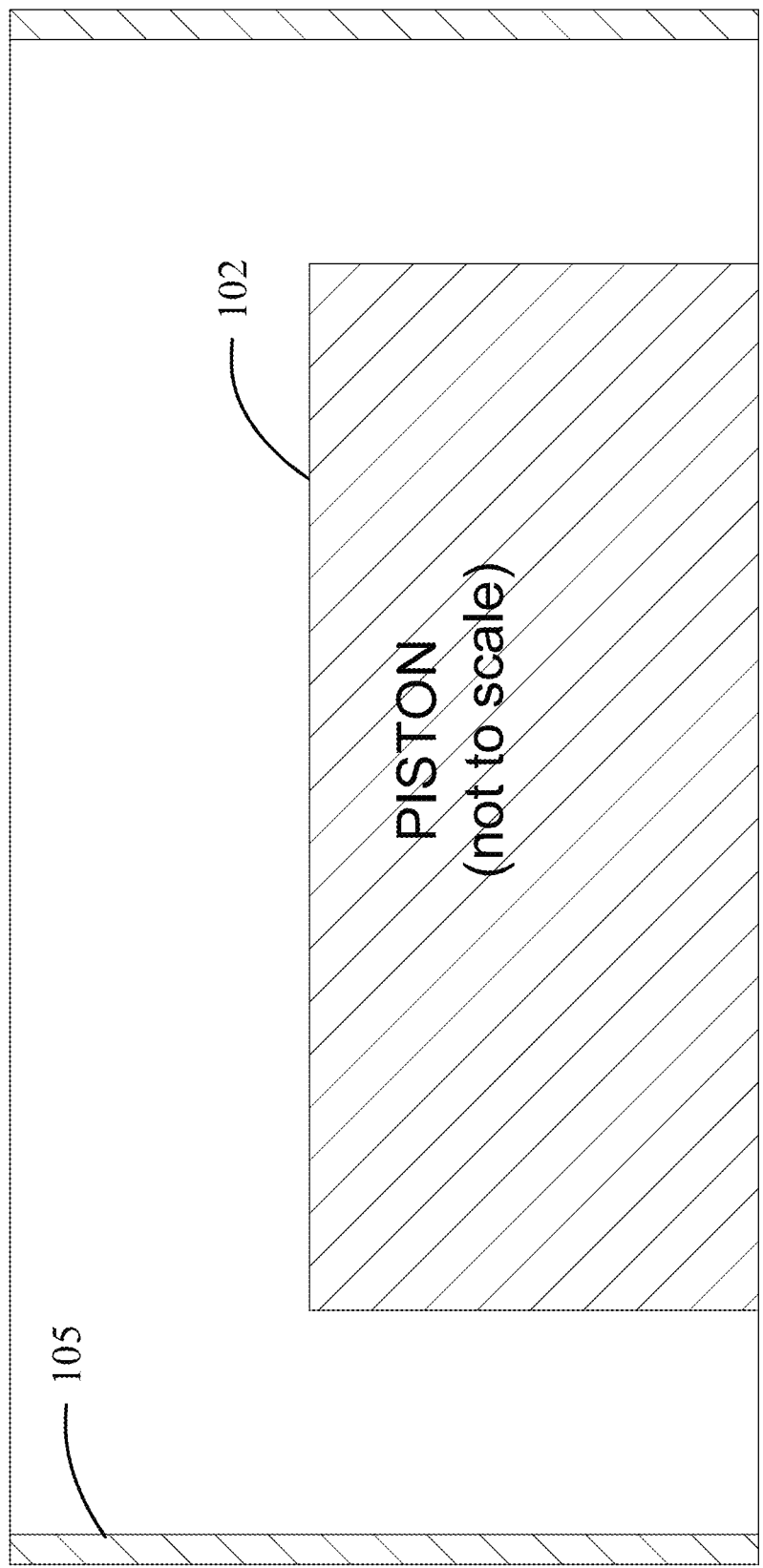
FIG. 2 is a cross section view of the top end of the piston and the adjacent shaft walls of a GPP.

FIG. 2 is a cross section view of the top end of the piston 102 and the adjacent shaft wall 105 of a GPP, in which construction of the piston 102 has been completed as disclosed, for example, in U.S. Pat. No. 9,869,291.

Figure 3:
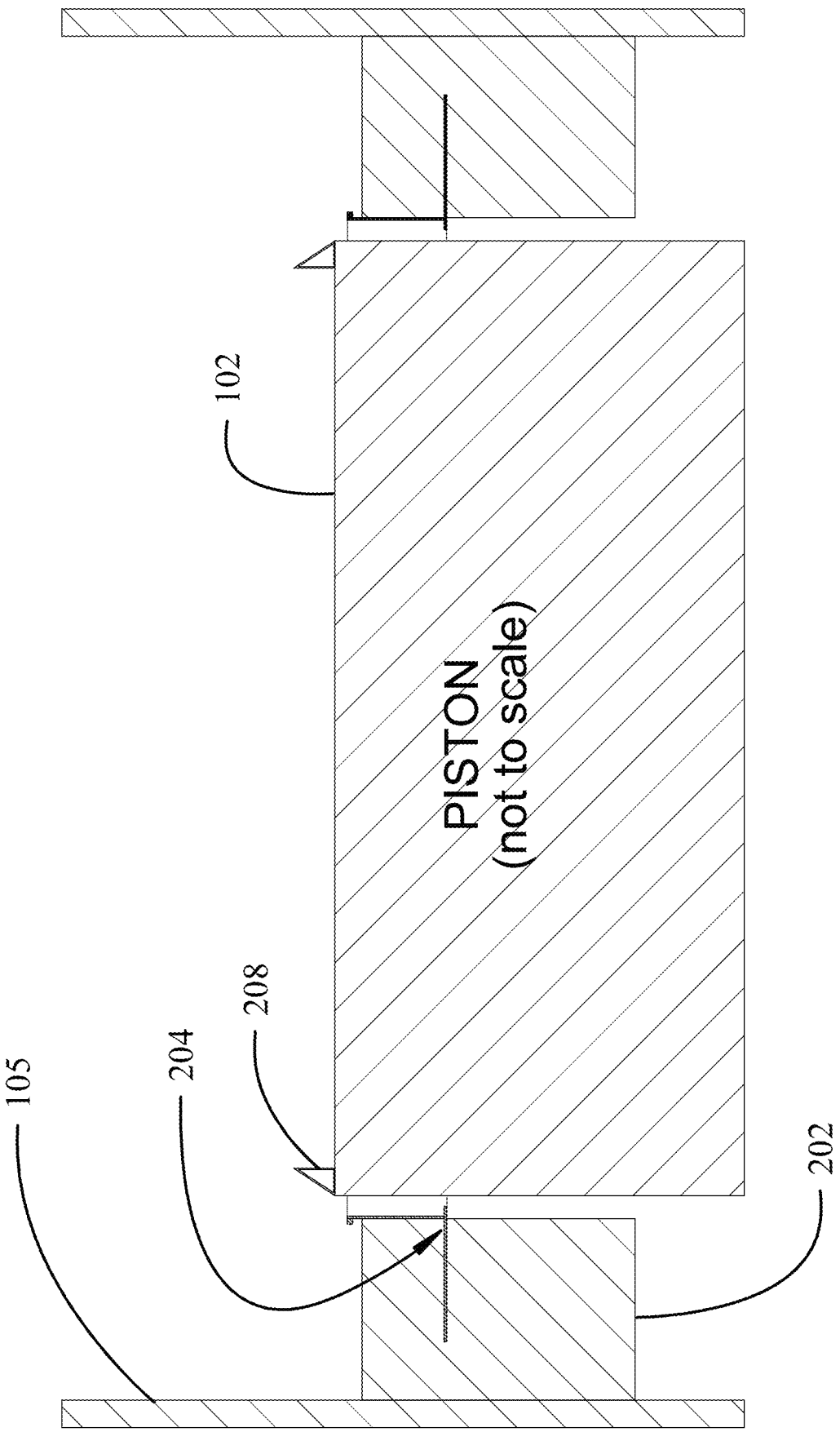
FIG. 3 shows the seal assembly support base, seal mount and seal assembly alignment guides installed with the piston.

In FIG. 3 the sealing system for the GPP with the seal assembly support base 202, seal mount 204 and seal assembly alignment guides 208, to be described in greater detail subsequently, are shown with the piston 102. The seal assembly support base 202 surrounds the piston 102, is strongly anchored into the shaft wall 105, typically with rock bolts, and is constructed of material such as reinforced concrete capable of withstanding the high pressure differential between the chamber 108 below the seal assembly and the chamber 106 above. The seal mount 204 is typically fabricated of steel or some other strong, rigid material.

As seen in FIG. 4, the seal mount 204 incorporates a radial flange 210 adapted to anchor the seal mount to the support base 202 by embedding the radial flange in the support base or attaching the radial flange to a top or bottom surface of the support base. A vertical flange 212 extends from an inner circumference of the radial flange 210. A rim 214 extends radially outward from an upper end of the vertical flange 212 and a foot 216 extends radially inward from the vertical flange 212. The seal assembly alignment guides 208 are circumferentially spaced at intervals around a top surface 107 of the piston 102 to assist with placement of the seal assembly 206, as explained below.

As seen in FIG. 5, the seal assembly 206 has a seal carrier 220 terminating at a top end with a plurality of circumferentially spaced bosses 222. A plurality of guide rings 224 are mounted concentrically in the seal carrier 220 with a seal group 226 supported between vertically adjacent guide rings on a support ring 248. A plurality of clamp assemblies 227 are each circumferentially aligned with a respective one of the bosses and each have a clamp 228 configured to engage the rim 214 of the vertical flange 212. The clamp 228 of each clamp assembly is bolted to the seal carrier 220 using a shoulder bolt 230 with a shoulder flange 232 that prevents the bolt from separating from the clamp. A threaded barrel 234 of the bolt passes through a threaded bore 236 in the respective one of the bosses 222 of the seal carrier 220 and an end flange 238 welded or otherwise attached to an inner end of the bolt preventing the bolt from being entirely removed from the boss of the seal carrier 220. The seal carrier 220 and guide rings 224 may be positioned on or supported by the foot 216 and a bottom seal 217 may be present between the bottom guide ring and the foot. In alternative implementations, the clamp assemblies or a comparable latch mechanism may be present at a lower end of the seal assembly to engage a foot of the seal mount or even a lower surface of the seal assembly support base.

Each seal group 226 includes a seal 240 and contact pads 246 attached to the support ring 248. The seal 240 is formed of a resilient material, such as a synthetic polymer (e.g., polyurethane, polybutadiene, etc.), that is capable of being compressed against the piston 102 and conforming to the outer surface 103 to create a seal against the passage of working fluid between the seal assembly 206 and the piston 102. In exemplary implementations, the seal 240 may be formed (e.g., machined, molded, extruded, etc.) in segments that can be field welded or bonded into a continuous ring. The contact pads 246 are formed of a strong, low friction material such as ultra-high molecular weight polyethylene or Vesconite that resist compression. The contact pads 246 are disposed above and/or below the seal 240, are bolted or otherwise attached to the seal support ring 248 and are configured to prevent contact between the guide rings and surface 103 of the piston 102. The seal 240 and the contact pads 246 are configured to have a low coefficient of friction when sliding on a steel surface, such as the surface 103 of the piston 102. If the seal assembly 206 encounters a raised discontinuity (e.g., ridge, bump, swell, etc.) in the surface 103 of the piston 102, the relatively hard contact pads 246 are configured to displace the seal carrier 220 locally outward in the area of the discontinuity, protecting the relatively soft seal 240 from a shearing action.

In operation, the seal 240 expands inward in a radial direction due to the pressure of the working fluid in the lower chamber 108 below the seal assembly 206, tightly filling the gap between the seal carrier 220 and the piston 102 to prevent fluid from leaking past.

Figure 6:
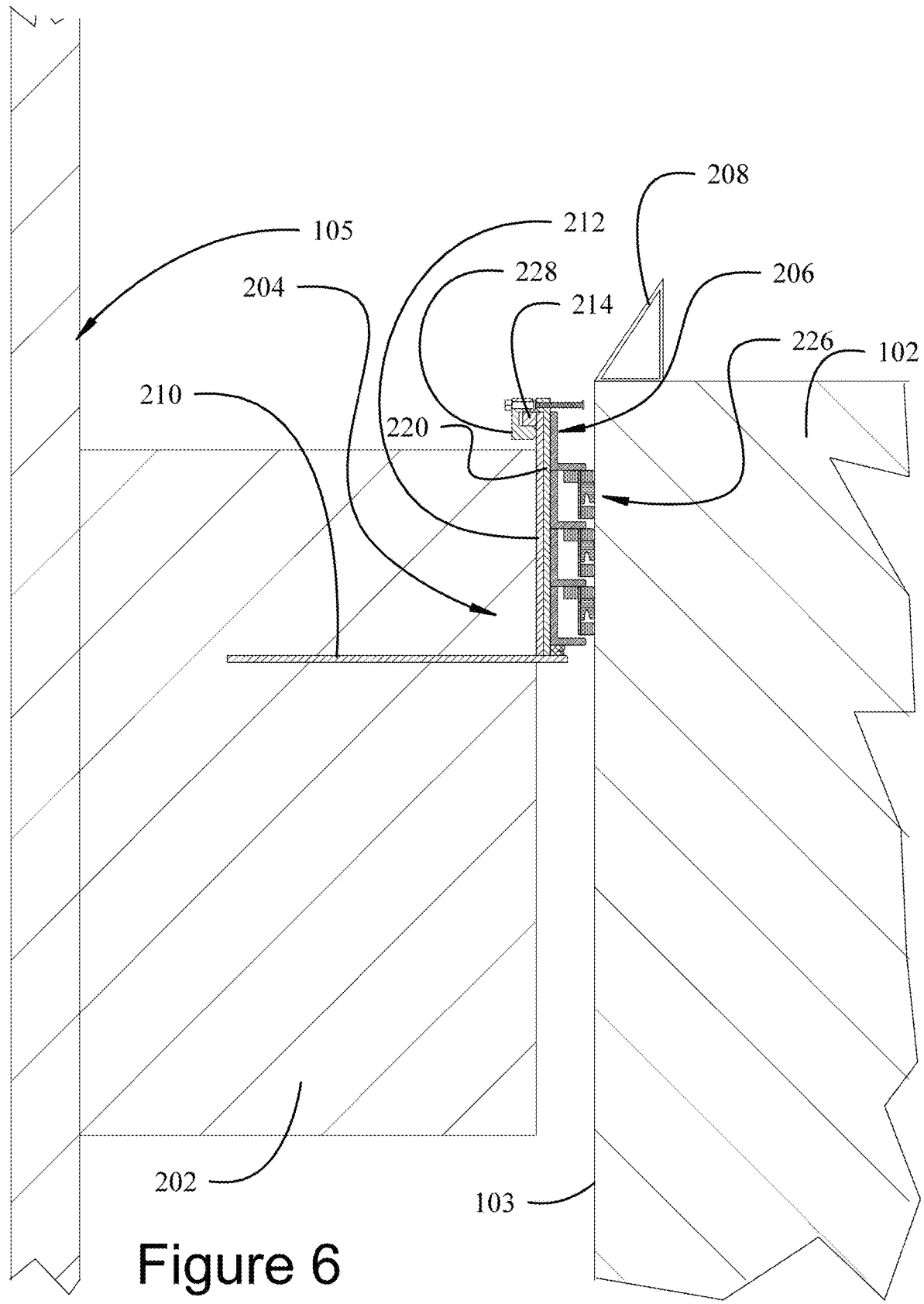
FIG. 6 shows one side of the upper end of the piston with the seal assembly and locking clamp installed with the locking clamp bolt in the locked position.

FIG. 6 is an expanded view of one side of the upper end of the piston with the seal assembly 206 installed on the seal mount 204. The clamp 228 is shown in a locked or closed position engaging the rim 214.

Figure 7:
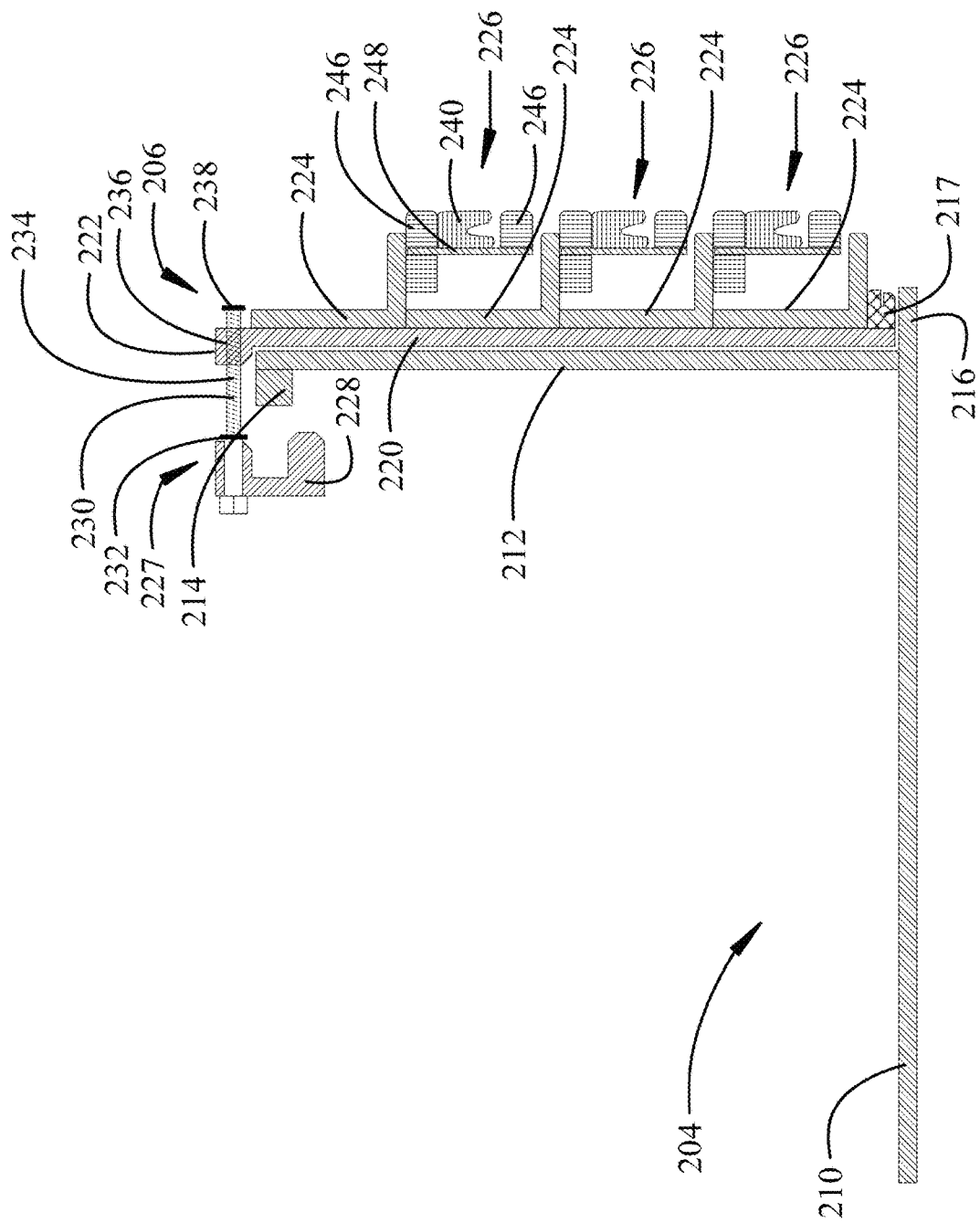
FIG. 7 is a close-up cross section view of the seal mount with seal assembly, with the locking clamp opened. Locking clamp bolt is in the released position.

FIG. 7 is a close-up cross section view of the seal mount 204 and seal assembly 206. In this view, the shoulder bolt has been rotated to release the locking clamp placing the locking clamp in an unlocked or open position for installation on the seal mount 204 or in preparation for removal of the seal assembly from the seal mount.

Figure 8:
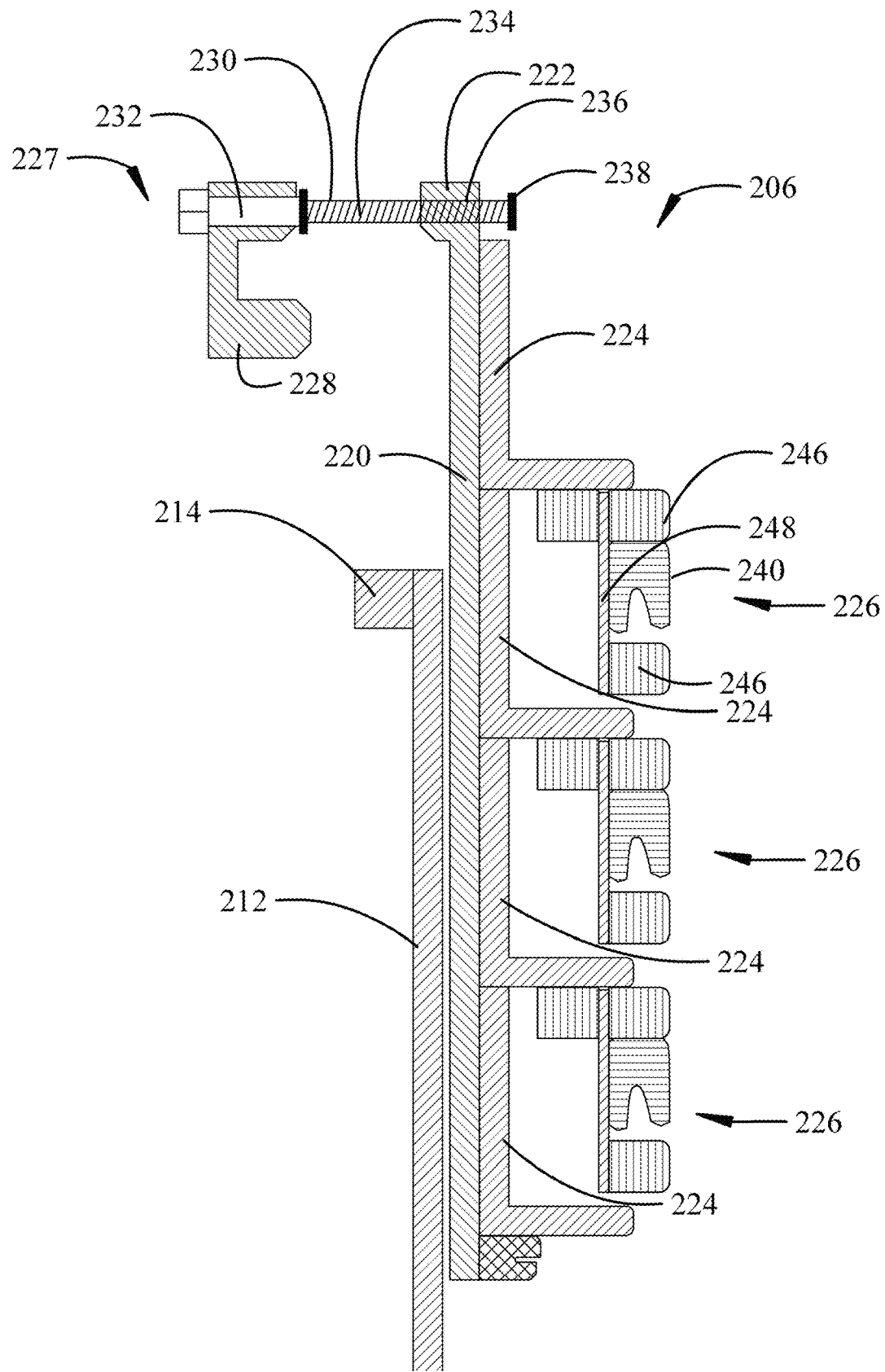
FIG. 8 is a close-up cross section view of the top end of the seal mount with the seal assembly partially lifted away from the seal mount.

In FIG. 8 the seal assembly 206 has been moved vertically along an axis of the piston and partially lifted away from the seal mount 204.

Figure 9:
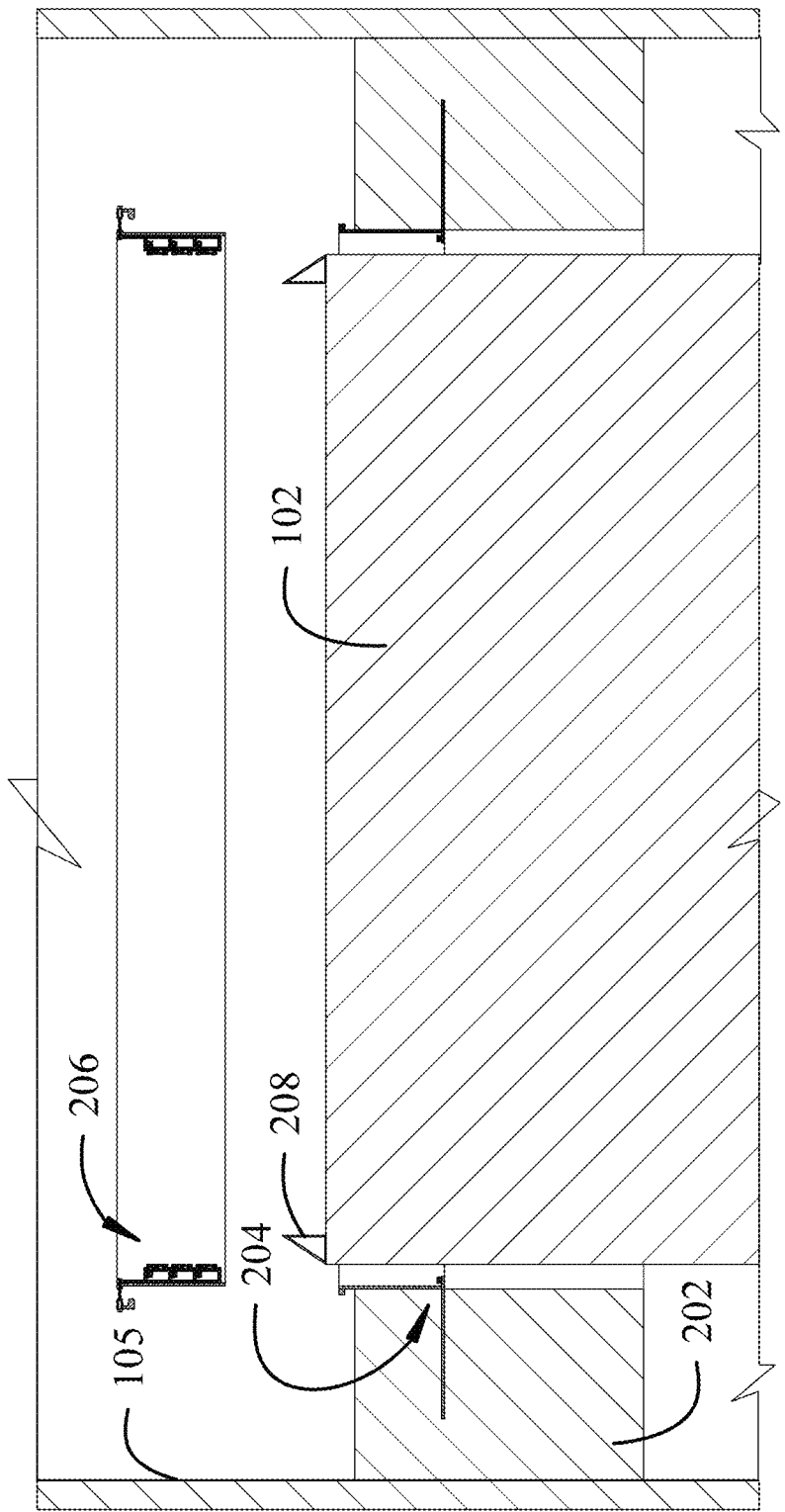
FIG. 9 is a cross section view of the top end of the piston, the adjacent seal assembly support base, and the seal mount, with the seal assembly lifted up from the seal mount.

FIG. 9 is a cross section view of the top end of the piston 102, the adjacent seal assembly support base 202, and the seal mount 204, with the seal assembly 206 removed from the seal mount.

Figure 10:
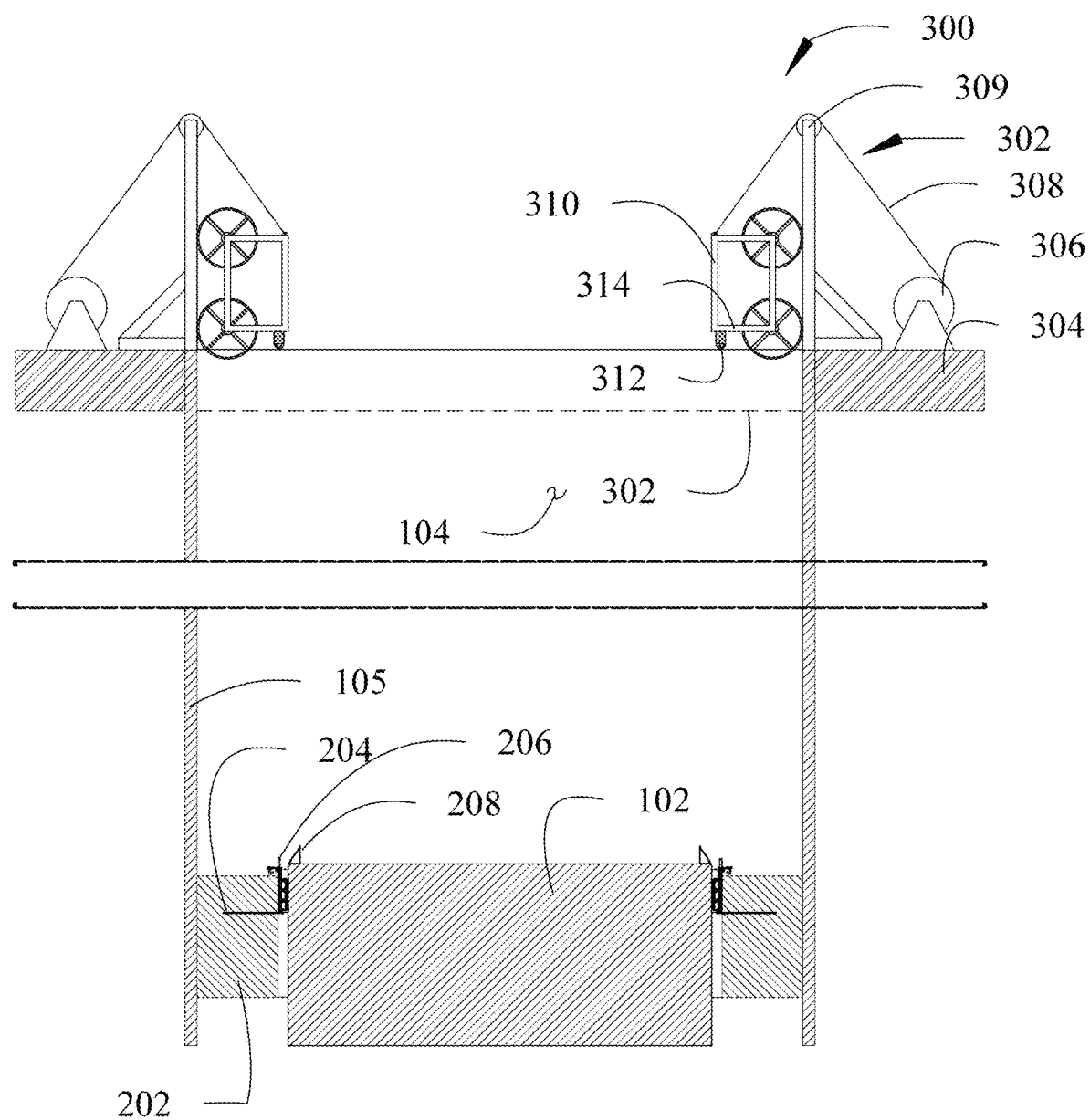
FIG. 10 is a cross section split view of the top end of the shaft with a hoist and carriage system for use in installing and removing the seal assembly.

The configuration of the support base 202, seal mount 204 and seal assembly 206 allow for ease of installation and removal of the seal assembly for maintenance. FIG. 10 is a cross section split view of the top end of the piston 102 and the top end of the shaft 104 showing one implementation of a hoist and carriage system 300 for use in installing and removing the seal assembly 206 without the need to pump the water out of the shaft. A plurality of hoist assemblies 302 are circumferentially spaced about the upper rim 304 of the shaft aligned with the bosses 222 of the seal carrier 220 (four locations at 90° separation on the circumference in the example implementation as described subsequently). Each hoist assembly 302 includes a cable drum 306 with one or more cables 308 that run up over a sheave or pulley block 309, then down to attach to a carriage 310 configured to translate longitudinally in the shaft. For the implementation shown, wheels are employed on the carriages. In other implementations the carriages may employ skids to slide along the wall of the shaft or a bearing system engaged to vertical rails on the shaft wall. In alternative implementations, the hoist drum may be mounted on the shaft wall to eliminate the sheave. The carriage 310 includes grippers 312 that are adjustable on a lower frame element 314 for radial alignment with the seal assembly 206 for grabbing the seal assembly.

Figure 11:
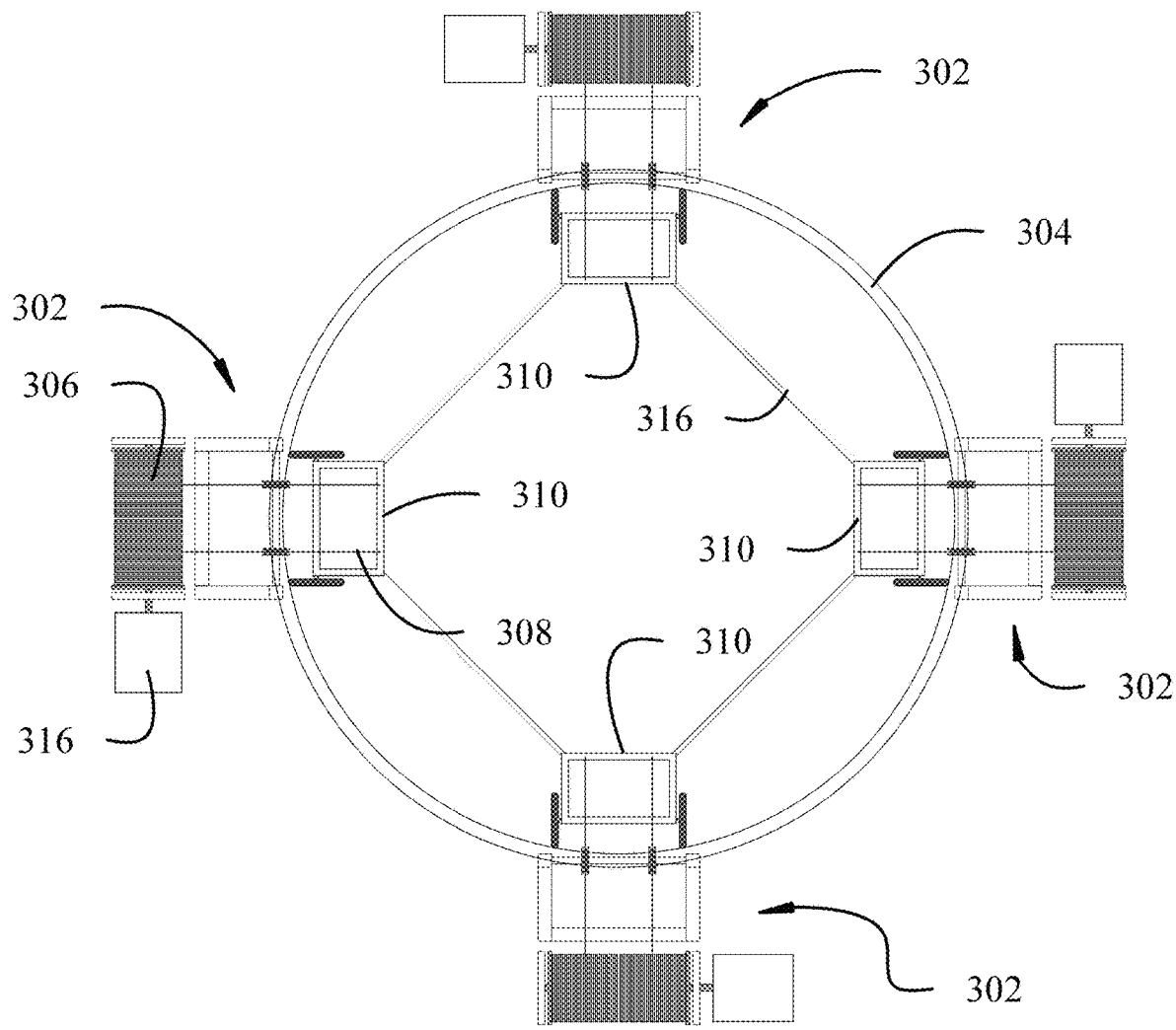
FIG. 11 is a plan view of the top of a GPP shaft with four hoist carriages.

The hoists and carriages are deployed around the upper rim 304 of the shaft 104 as seen in the top plan view of FIG. 11 with four carriages 310. Other implementations may utilize fewer or more carriages circumferentially spaced about the rim, depending on the needs of particular installations. As shown, each carriage is hoisted by two hoist cables 308, but in some embodiments one cable may suffice and in others more than two cables may be preferred. A motor 316, typically electrically powered although other types may be substituted, drives the cable drum 306. The carriages 310 may be interconnected with a frame 316 to fix relative placement of the carriages.

Figure 12:
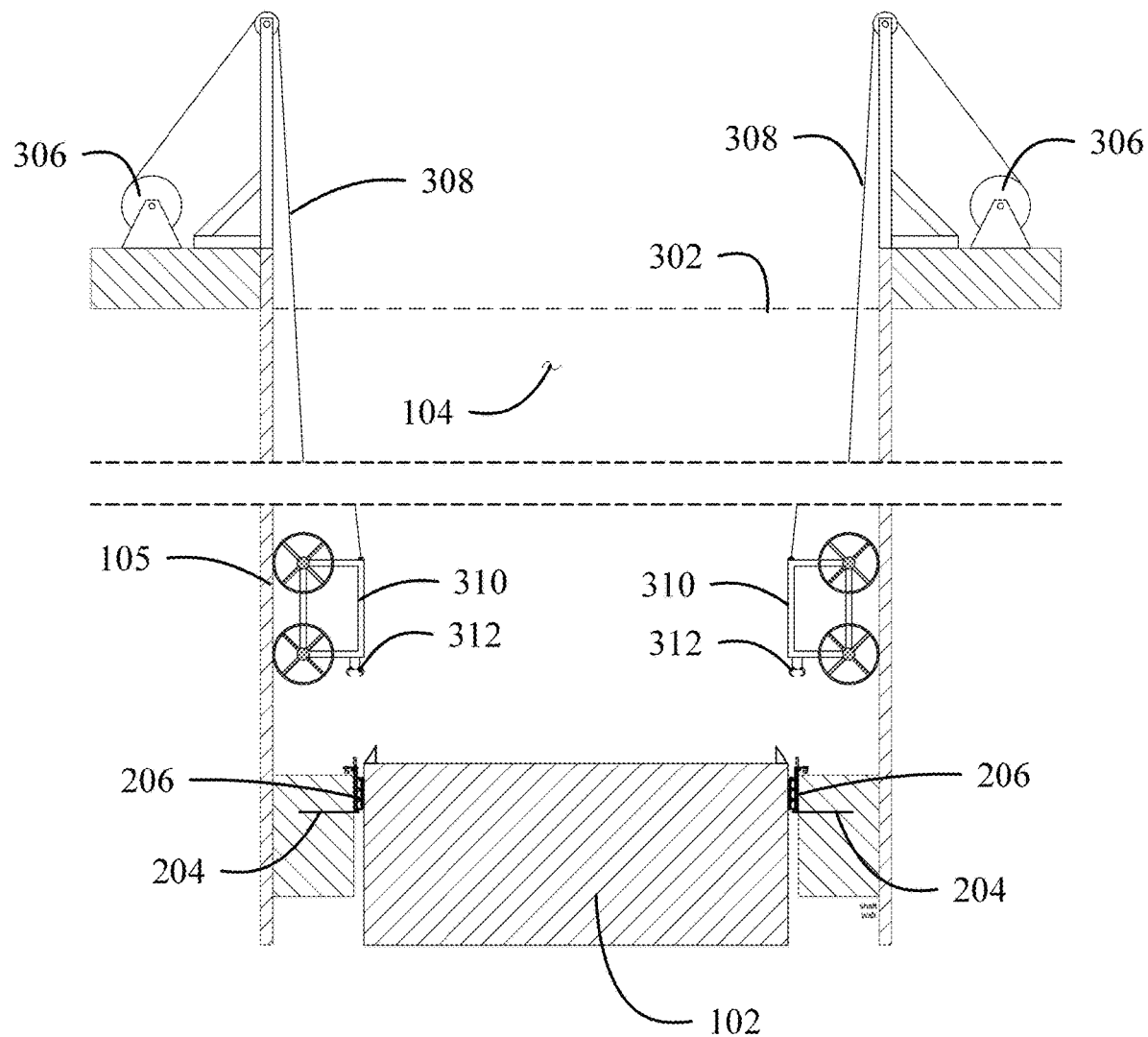
FIG. 12 is a cross section split view of the shaft and piston with the carriage lowered close to the piston.

In operation as seen in FIG. 12, the carriages 310 have been lowered, each by its respective hoist assembly 302, until they are close to the top end of the piston. The carriage wheels 318 ride down along the shaft wall 105 and the grippers 312 are aligned with the seal assembly 206 as the carriage approaches. The locking clamps on the seal assembly are opened by appropriate rotary attachments on the grippers or prior to lowering the carriages, as shown in FIG. 12, by a remotely-operated vehicle (not shown).

Figure 13:
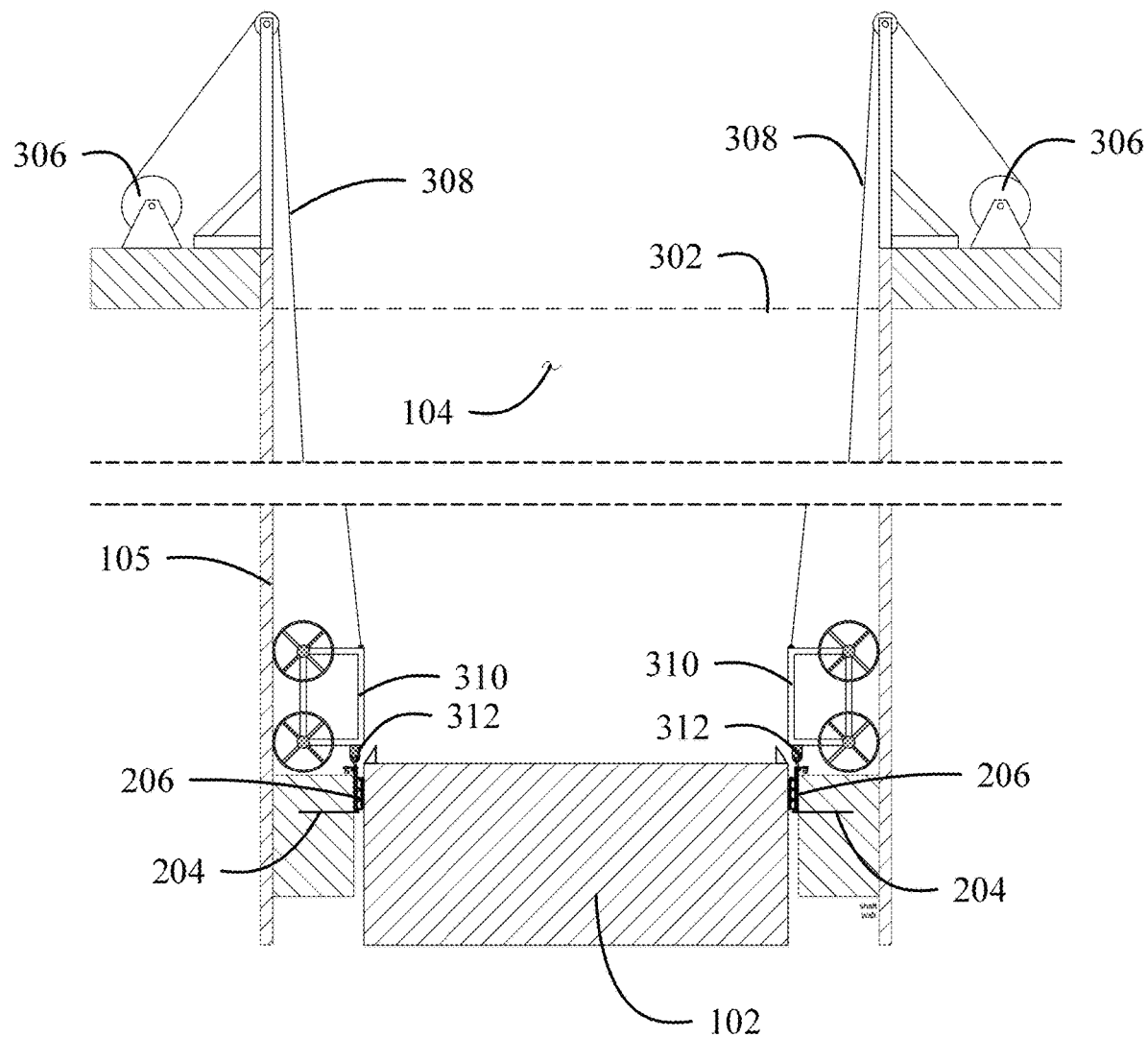
FIG. 13 is a cross section split view of the shaft and piston with the carriage clamps closed on the grip bar of the seal assembly.

The carriages 310 are positioned in proximity to the support base 202 and the top of the piston as seen in FIG. 13 and the grippers 312 are closed to clamp onto the seal carrier 220 of the seal assembly 206. Typically, remote video cameras (not shown) and flood lights (not shown) will be used by the operator to observe this procedure and confirm proper gripper attachment. The gripper is remotely operated by the operator.

Figure 14:
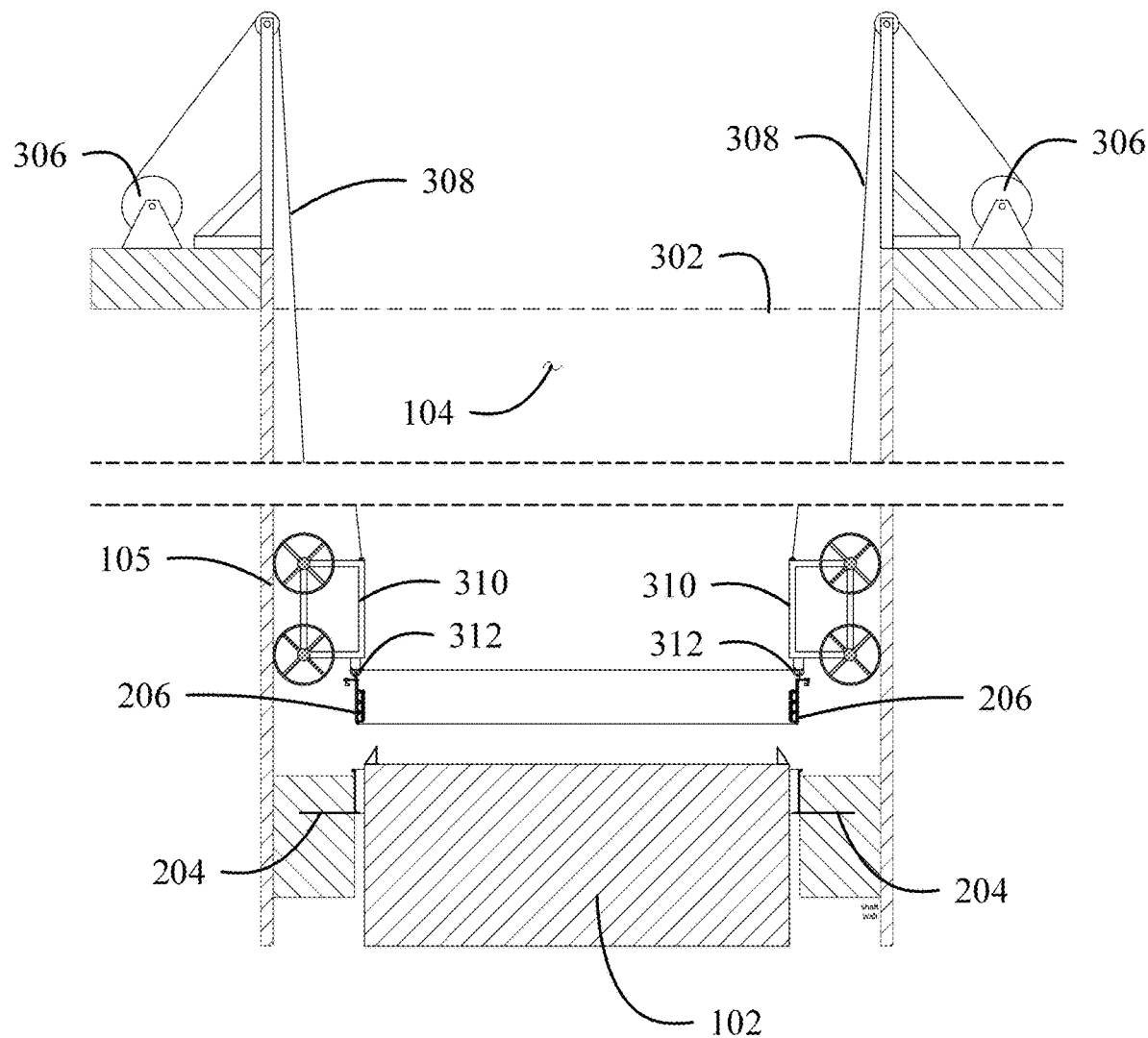
FIG. 14 is a cross section split view of the shaft and piston with the seal assembly hoisted away from the piston.

The hoist assemblies 302 are then employed to lift the carriages 310 and seal assembly 206 away from the seal mount 204 and piston 102 as seen in FIG. 14. All carriages 310 are hoisted in unison to keep the seal assembly 206 level and prevent binding of the seal assembly in the annulus between the seal mount 204 and the piston 102.

Figure 15:
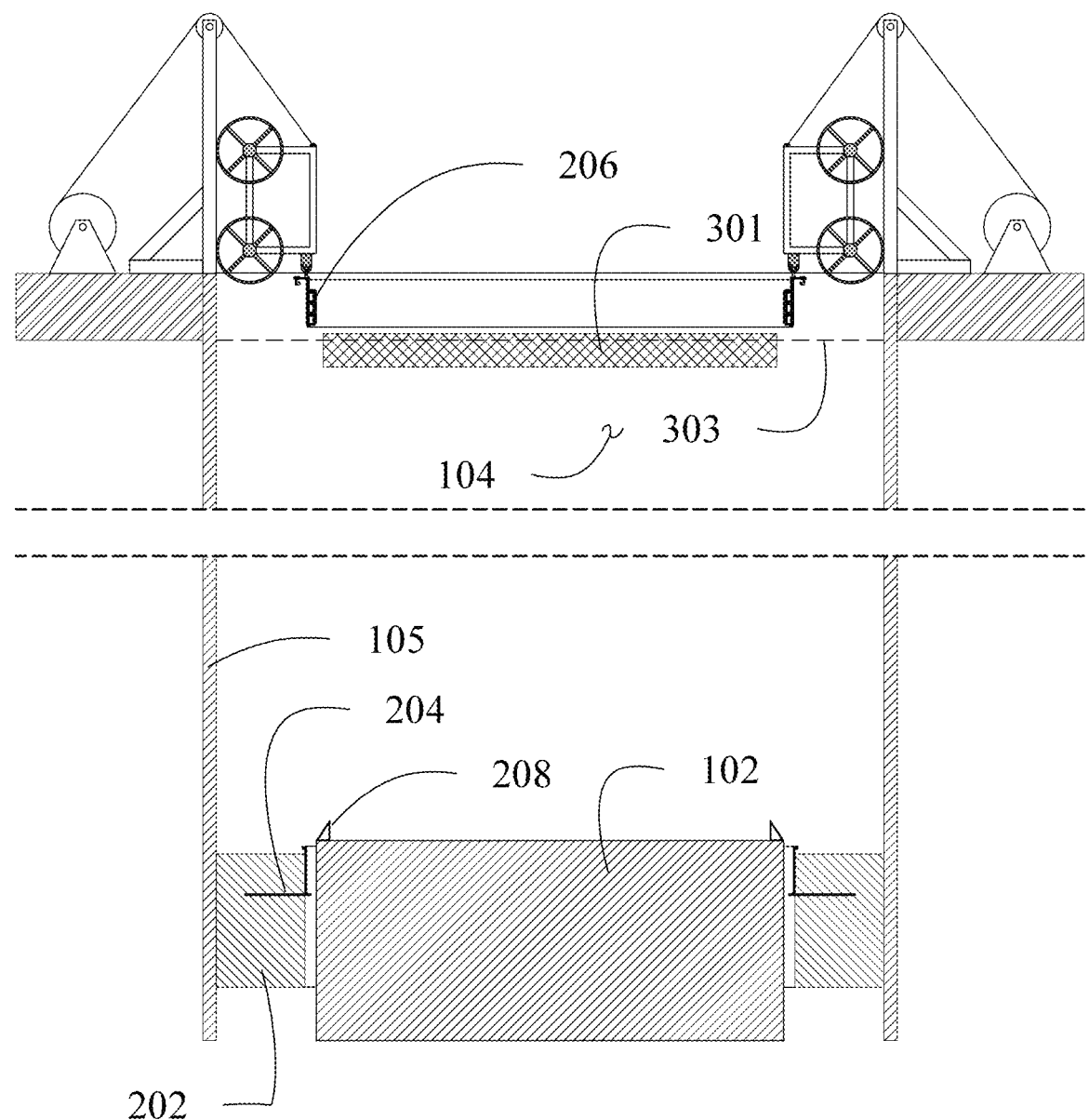
FIG. 15 is a cross section split view of the shaft and piston with the seal assembly hoisted all the way to the surface, above the water level of the shaft.

Once the carriages 310 have been fully retracted and the seal assembly hoisted all the way to the surface, above the water level 303 of the shaft 104, as seen in FIG. 15, a work platform 301, floating or otherwise supported, is placed inside the shaft to give workers easy access to the seal assembly 206. This allows inspection of the assembly, any required repairs, and replacement of worn seal elements 240. After completion of maintenance the seal assembly is lowered and re-installed in a reversal of the procedure previously described.

The previously mentioned figures and designs illustrate embodiments of the GPP and the seal system that provide for ease of maintenance and repair. A further implementation, described in detail below with respect to FIGS. 16-22, provides seismic isolation to protect against damage to the seal system and piston in the event of an earthquake with a seal mount 404 circumferentially surrounding the piston and supported in low friction engagement with respect to an alternative seal assembly support base 402.

Figure 16:
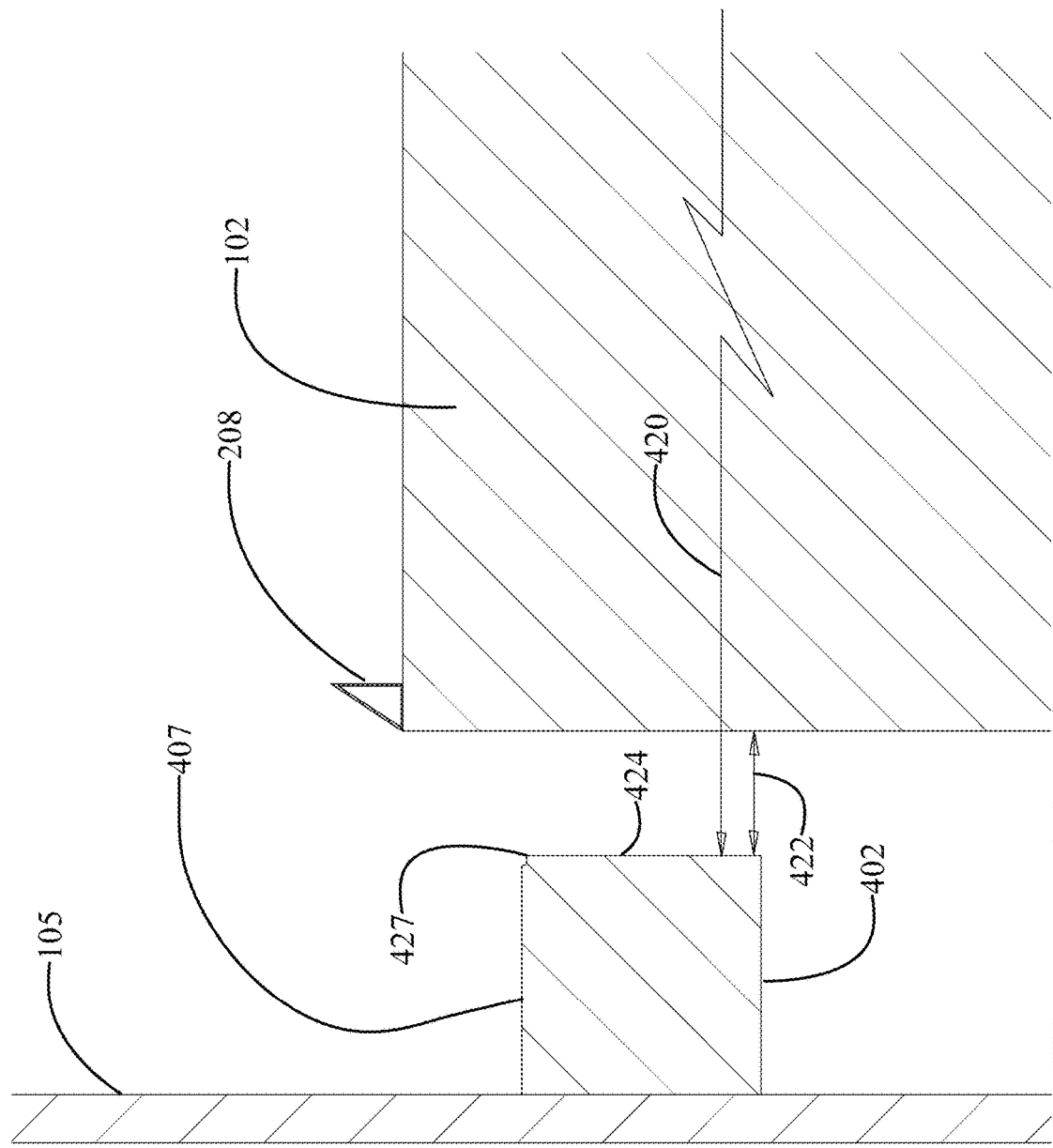
FIG. 16 is a cross section view of a second embodiment of the seal assembly support base adjacent to the top end of the piston of a GPP.

FIG. 16 shows an alternative seal assembly support base 402 which is heavily reinforced to withstand high pressure and strongly anchored to the shaft wall, as in the initial implementation, but with an increased inner radius 420, leaving a larger gap 422 between an inner surface 424 of the support base 402 and the surface 103 of the piston 102. An alternative seal mount 404 incorporates a radial flange 410 and a vertical flange 412 as will be described subsequently with respect to FIG. 18.

Figure 17:
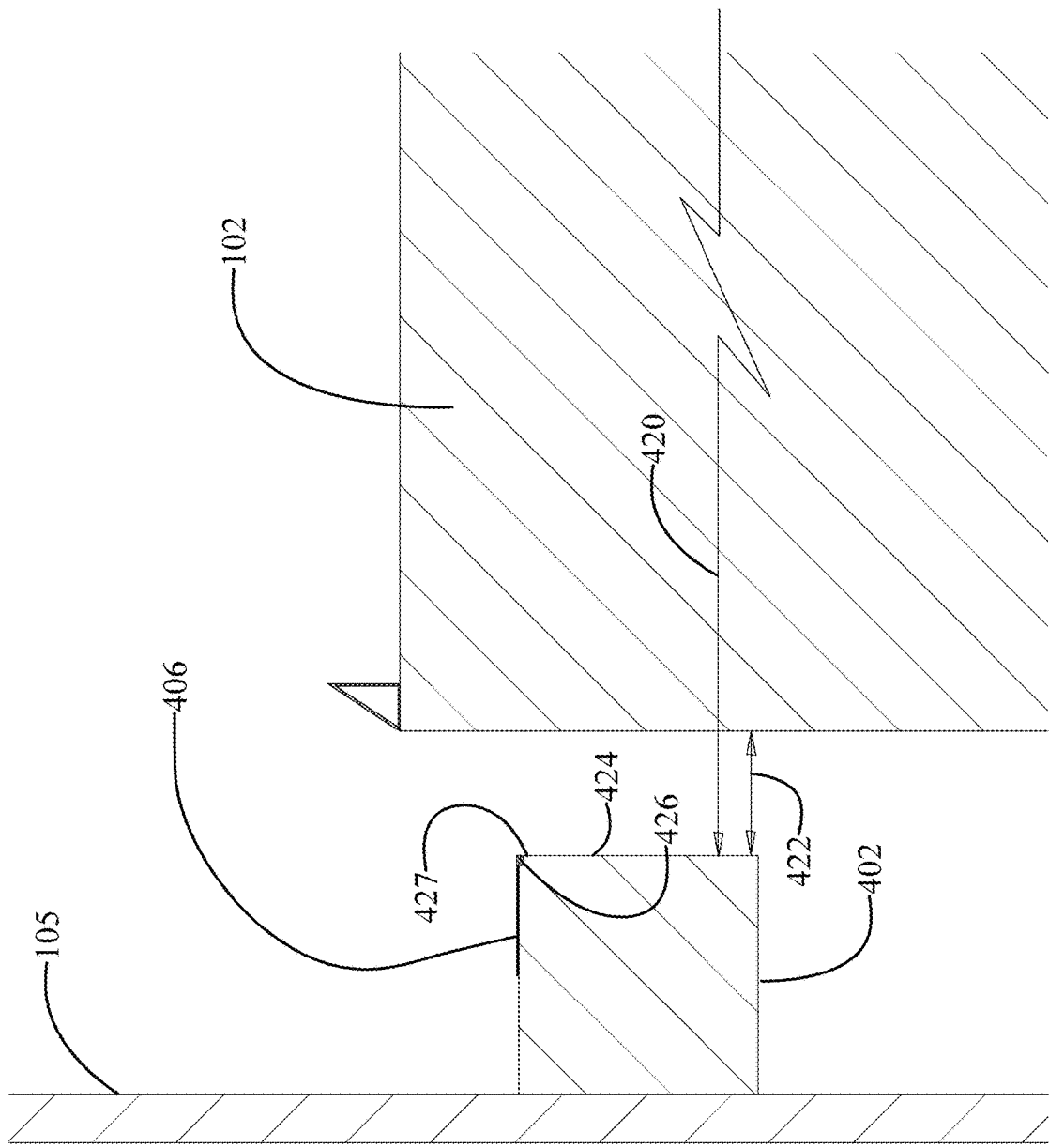
FIG. 17 shows a lower bearing plate and seal installed on the top surface of the seal assembly support base.

As seen in FIG. 17, a lower bearing plate 406 is mounted on an upper surface 407 of the seal assembly support base 402 proximate the inner surface 424. The bearing plate 406 is typically fabricated of a material with a very low coefficient of friction such as polytetrafluoroethylene (PTFE) and extends in a ring all the way around the assembly support base upper surface 408 encircling the piston 102. The lower bearing plate 406 will become the "lower bearing" in the seismic isolation system described below. A seal 426 is installed below the lower bearing plate 406 at a top inner edge 427 of the seal assembly support base to prevent water intrusion.

Figure 18:
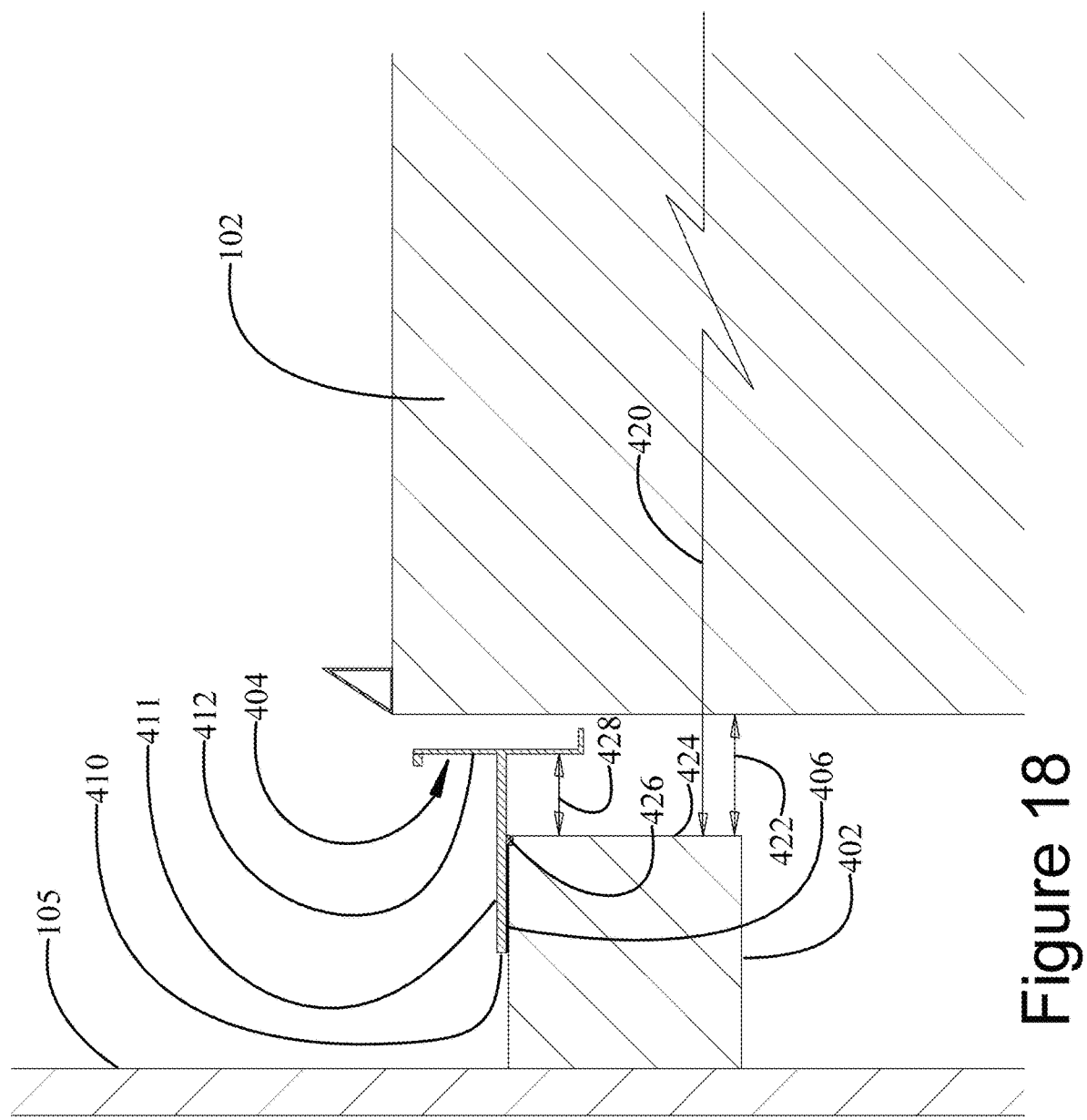
FIG. 18 shows a second embodiment of the seal mount installed on the top surface of the seal assembly support base.

As seen in FIG. 18, the radial flange 410 of the seal mount 404 is supported on the top surface of the seal assembly support base 402, resting on top of the lower bearing plate 406. The seal mount circumferentially surrounds the piston 102, as in the prior implementation. The radial flange 410 extends inward from the inner surface 424 of the seal assembly support base 402 with the vertical flange 412 spaced from the inner surface 424 by a radial relief 428.

Figure 19:
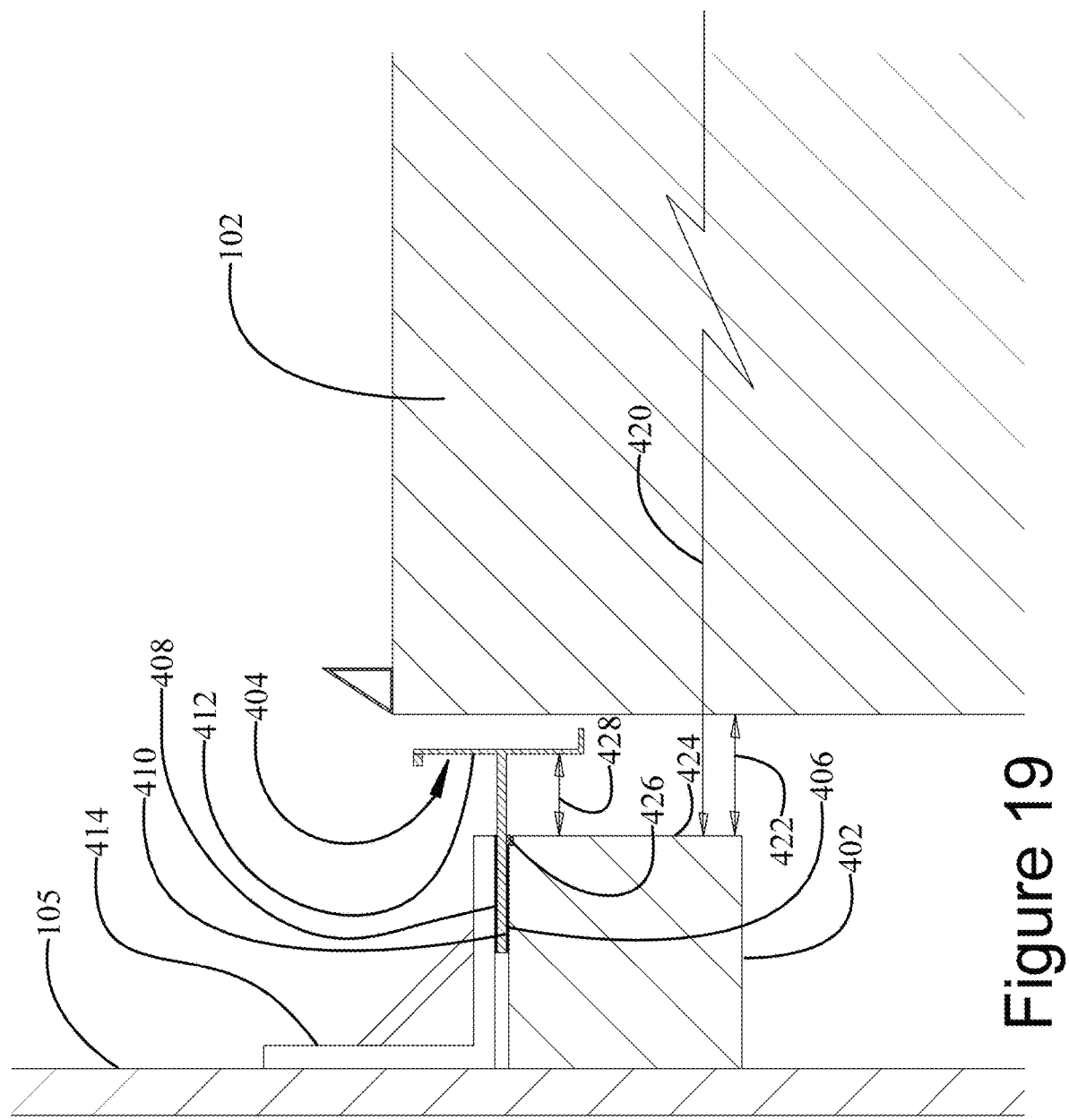
FIG. 19 shows an upper bearing plate and heavy brace installed on top of the seal mount.

As seen in FIG. 19 an "upper bearing" for seismic isolation of the seal mount is provided by a plurality of upper bearing plates 408, also made of a material with low friction coefficient such as PTFE, supported in engagement with a top surface 411 (seen in FIG. 18) of the radial flange 410 of the seal mount 404 by a plurality of heavy braces 414 strongly anchored to the shaft wall 105, typically with rock bolts, to withstand the high force that will be caused by high pressure water beneath the seal mount 404. Each of the upper bearing plates 408 will typically be roughly the same width as the heavy brace normal to the piston circumference.

Figure 20:
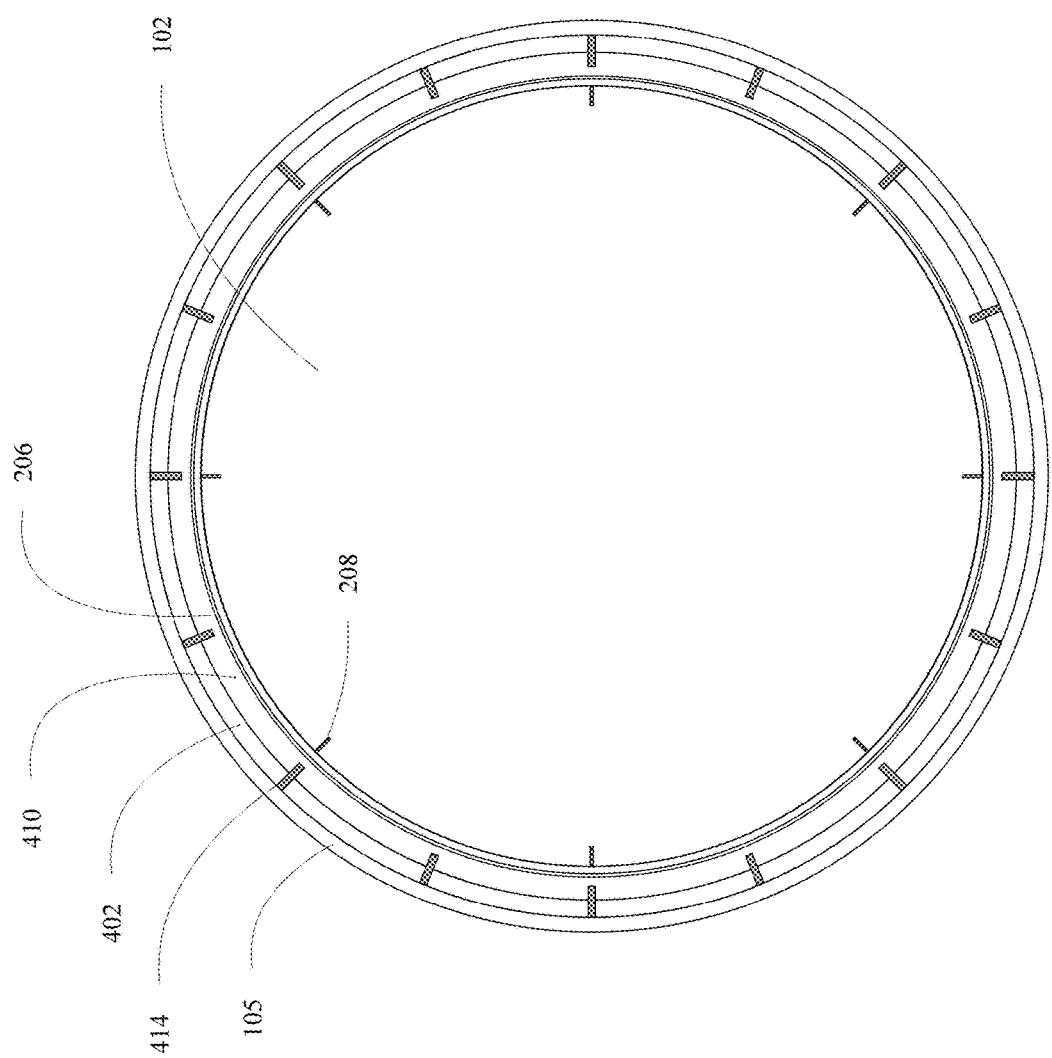
FIG. 20 is a plan view of the top of the piston of FIG. 19.

The plurality of brace/upper bearing plate pairs around the piston circumference are shown in FIG. 20 is a plan view of the top of the piston of FIG. 19. In the exemplary implementation, 16 heavy braces are employed. In other embodiments there may be more or less than 16.

Figure 21:
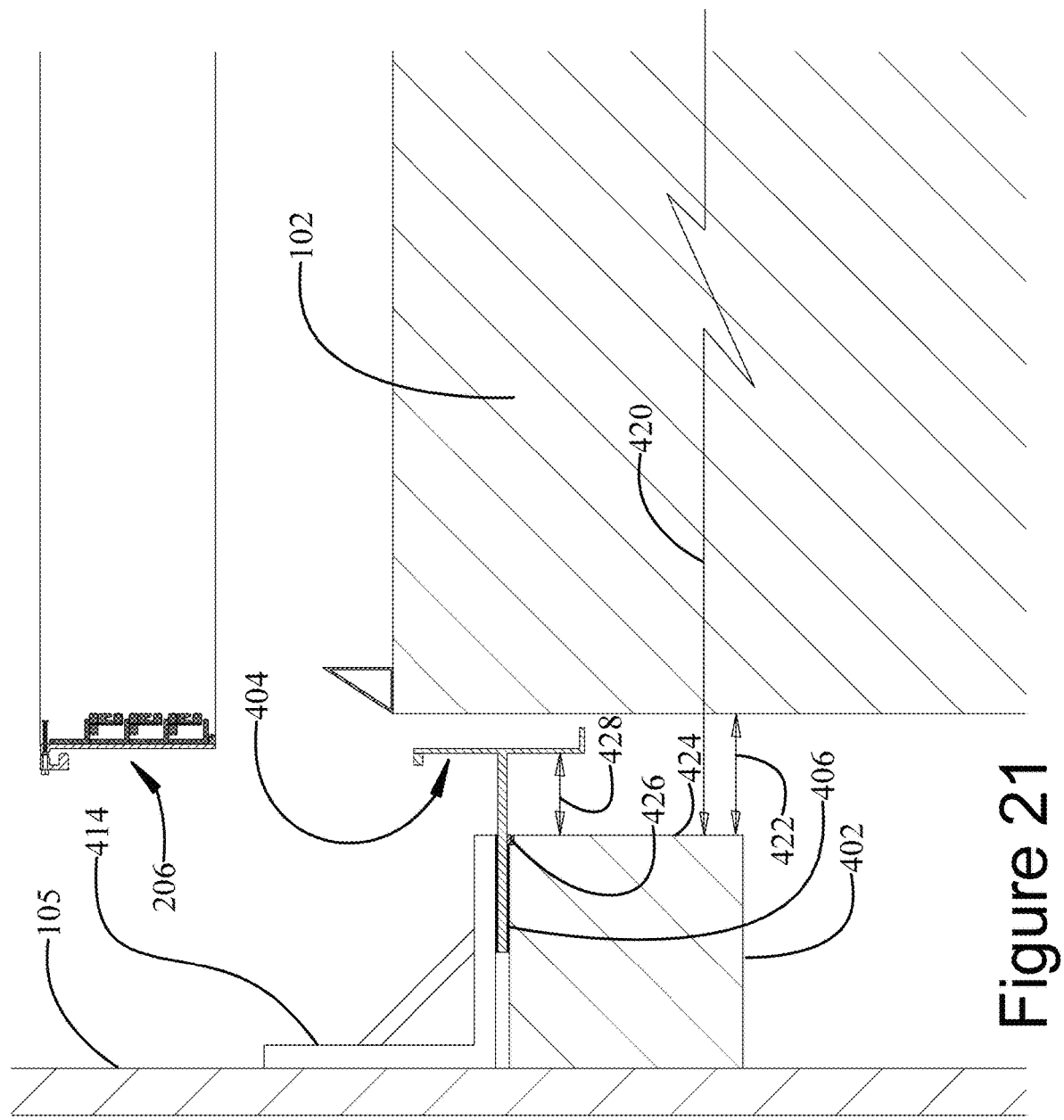
FIG. 21 is a cross section view of the seal assembly being lowered toward the seal mount.

The seal assembly 206 as disclosed in the previous implementation is attached to the vertical flange 412 of the seal mount 404. FIG. 21 shows the seal assembly being lowered toward the seal mount 404, typically by hoists and carriages as described with respect to the initial implementations (not shown), or by one or more cranes (not shown). The seal assembly locking clamps 228 are shown in the open position.

Figure 22:
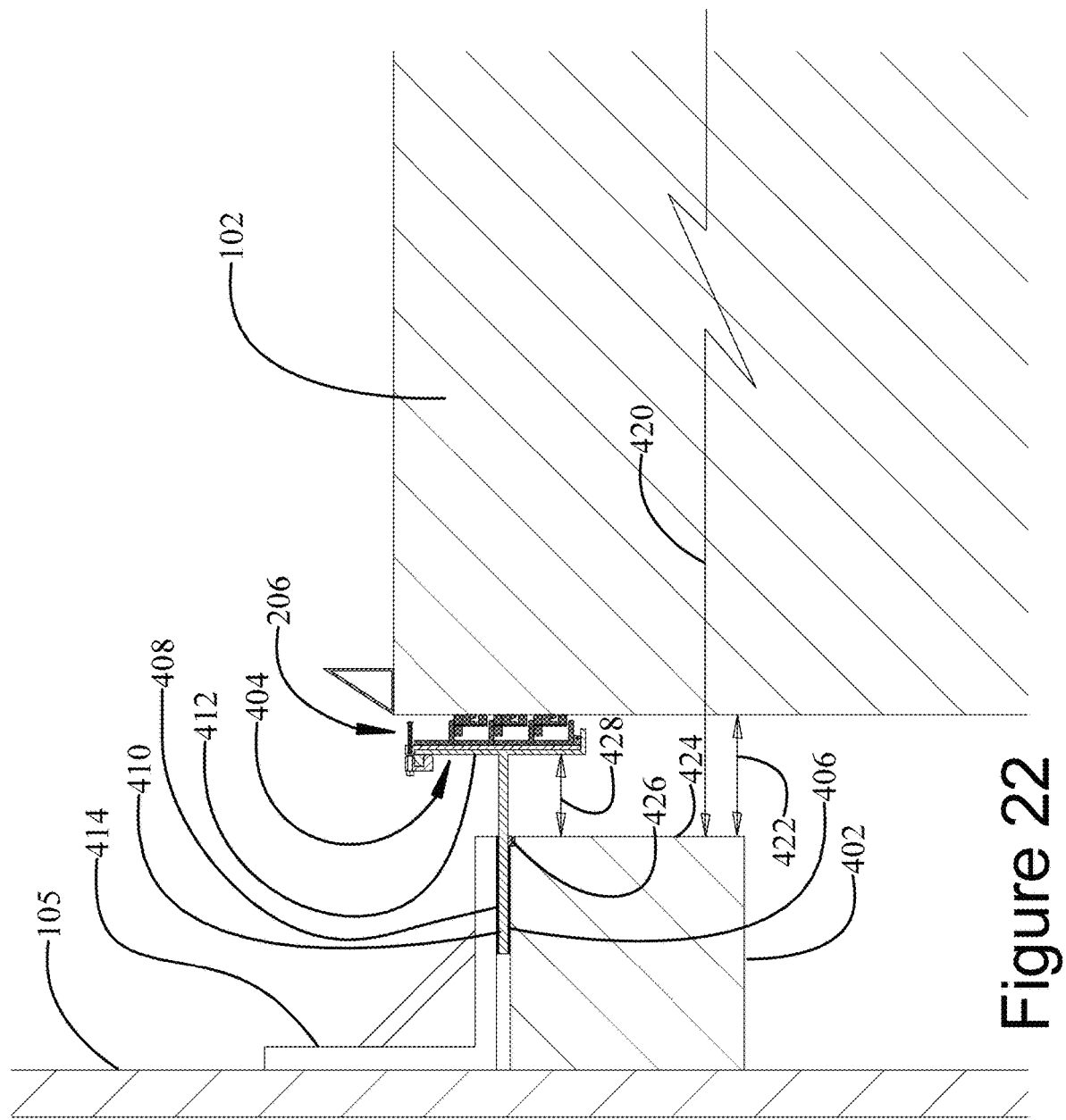
FIG. 22 is a cross section view of the seal assembly installed on the seal mount and clamped into place.

The seal assembly installed on the seal mount is shown in FIG. 22 with the locking clamp locking bolts tightened to lock the seal assembly in place. Tightening the locking bolts is typically accomplished by a Remotely Operated Vehicle (ROV) designed for use in deep water. ROVs of this type are commercially available and in frequent use in offshore oil facilities.

The radial flange 410 of the seal mount 404 is held between the upper bearing and the lower bearing. In the event of an earthquake the seal assembly support base, heavy brace, and shaft wall will all move laterally with the surrounding ground by a varying amount, depending on the magnitude of the earthquake. The piston will tend to remain stationary due to inertia and the buoyant forces in the water column in the shaft 104. The seal mount will slide between the upper and lower bearings with the increased radial relief 428 in the seal mount 404 preventing the seal assembly support base from impacting the seal assembly or piston in all but the very largest earthquakes, thereby preventing damage to the system.

Having now described various implementations of the disclosure in detail as required by the patent statutes, those skilled in the art will recognize modifications and substitutions to the specific disclosure herein. Such modifications are within the scope and intent of the present disclosure as defined in the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "top", "bottom", "upper". "lower, "inner", "outer" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A sealing system for a Gravity Power Plant having a shaft (104) with a shaft wall (105) and a piston (102), the sealing system comprising:
a seal assembly support base (202) anchored into the shaft wall and surrounding the piston;
a seal mount having a radial flange (210) adapted to anchor the seal mount to the seal assembly support base (202) and a vertical flange (212) extending from an inner circumference of the radial flange; and,
a seal assembly (206) having at least one seal group (226) circumferentially contacting the piston, the seal assembly incorporating a plurality of circumferentially spaced clamp assemblies (227) configured to engage the seal assembly to the vertical flange, the plurality of clamp assemblies (227) having an open position releasing the seal assembly from the vertical flange and a closed position constraining the seal assembly on the vertical flange.

2. The sealing system as defined in claim 1 wherein the seal assembly further comprises:
a seal carrier (220) terminating at a top end with a plurality of circumferentially spaced bosses (222) wherein the plurality of clamp assemblies (227) are circumferentially aligned with a respective one of the bosses and each clamp assembly incorporates a clamp (228) configured to engage a rim (214) of the vertical flange.

3. The sealing system as defined in claim 2 wherein each clamp is bolted to the seal carrier with a shoulder bolt (230) having a threaded barrel (234) passing through a threaded bore (236) in the respective one of the bosses, and wherein removal of the bolt from the boss is prevented by an end flange attached to an inner end of the bolt.

4. The sealing system as defined in claim 2 wherein the at least one seal group comprises a plurality of seal groups and further comprising a plurality of guide rings (224) mounted concentrically in the seal carrier (220) with one of the plurality of seal groups (226) supported between vertically adjacent guide rings on a support ring (248).

5. The sealing system as defined in claim 4 wherein each of the plurality of seal groups comprises:
a seal (240) attached to the support ring; and
contact pads (246) attached to the support ring.

6. The sealing system as defined in claim 1 wherein, with the plurality of clamp assemblies (227) in the open position, the seal assembly is movable vertically along an axis of the piston and removed from the seal mount.

7. The sealing system as defined in claim 6 further comprising a hoist and carriage system (300) configured to grip an unlocked seal assembly and hoist the seal assembly from the seal mount to a water surface in the shaft.

8. The sealing system as defined in claim 7 wherein the hoist and carriage system comprises:
a plurality of hoist assemblies (302) circumferentially spaced about an upper rim (304) of the shaft;
a plurality of carriages (310) configured for longitudinal translation in the shaft, each carriage associated with one of the plurality of hoist assemblies and including grippers (312) that are adjustable on a lower frame element (314) for radial alignment with the seal assembly (206) for grabbing the seal assembly.

9. The sealing system as defined in claim 8 wherein each hoist assembly (302) includes a cable drum (306) with one or more cables (308) that attach to the associated one of the carriages.

10. The sealing system as defined in claim 9 wherein the one or more cables run over a sheave or pulley block (309) and then downwardly to attach to the associated one of the carriages.

11. A method for removal of a seal assembly in a sealing system as defined in claim 8, the method comprising:
- placing the plurality of clamp assemblies (227) in an open position;
- lowering the plurality of carriages to place the grippers in contact with the seal assembly;
- gripping the seal assembly with the grippers;
- raising the plurality of carriages.

12. The sealing system as defined in claim 1 wherein the seal assembly support base (202) has an inner surface (424) with an inner radius (420), providing a gap (422) between the inner surface and a surface (103) of the piston (102), and wherein the radial flange (410) is supported with low friction engagement with respect to the seal assembly support base (202) and extends inward from the inner surface of the seal assembly support base (202) with the vertical flange (412) spaced from the inner surface by a radial relief (428) within the gap.

13. The sealing system as defined in claim 12 wherein the radial flange is supported on a lower bearing (406) supported on a top surface (407) of the seal assembly support base (202) proximate the inner surface, with an upper bearing supported in engagement with a top surface (411) of the radial flange (410) of the seal mount (404).

14. The sealing system as defined in claim 13 wherein the lower bearing comprises a bearing plate (406) with a very low coefficient of friction and extends in a ring all the way around the seal assembly support base (202) upper surface (408) encircling the piston (102).

15. The sealing system as defined in claim 14 wherein the upper bearing comprises a plurality of upper bearing plates (408) mounted on a plurality of braces (414) strongly anchored to the shaft wall (105), each of the upper bearing plates (408) having substantially the same width as the brace normal to the piston circumference.

16. The sealing system as defined in claim 15 wherein the bearing plate and the plurality of upper bearing plates are fabricated with polytetrafluoroethylene (PTFE).

17. The sealing system as defined in claim 14 further comprising a seal (426) installed below the lower bearing plate (406) at a top inner edge (427) of the seal assembly support base (202) to prevent water intrusion.

* * * * *